Aug. 26, 1947.   H. A. BURT   2,426,166
SLUG CASTING MACHINE USING A HAND STICK
Filed July 16, 1942   12 Sheets-Sheet 1

INVENTOR
Harvey A. Burt
BY
ATTORNEYS

Aug. 26, 1947.   H. A. BURT   2,426,166
SLUG CASTING MACHINE USING A HAND STICK
Filed July 16, 1942   12 Sheets-Sheet 3

INVENTOR
Harvey A. Burt
BY
Norman Kennedy Campbell
ATTORNEYS

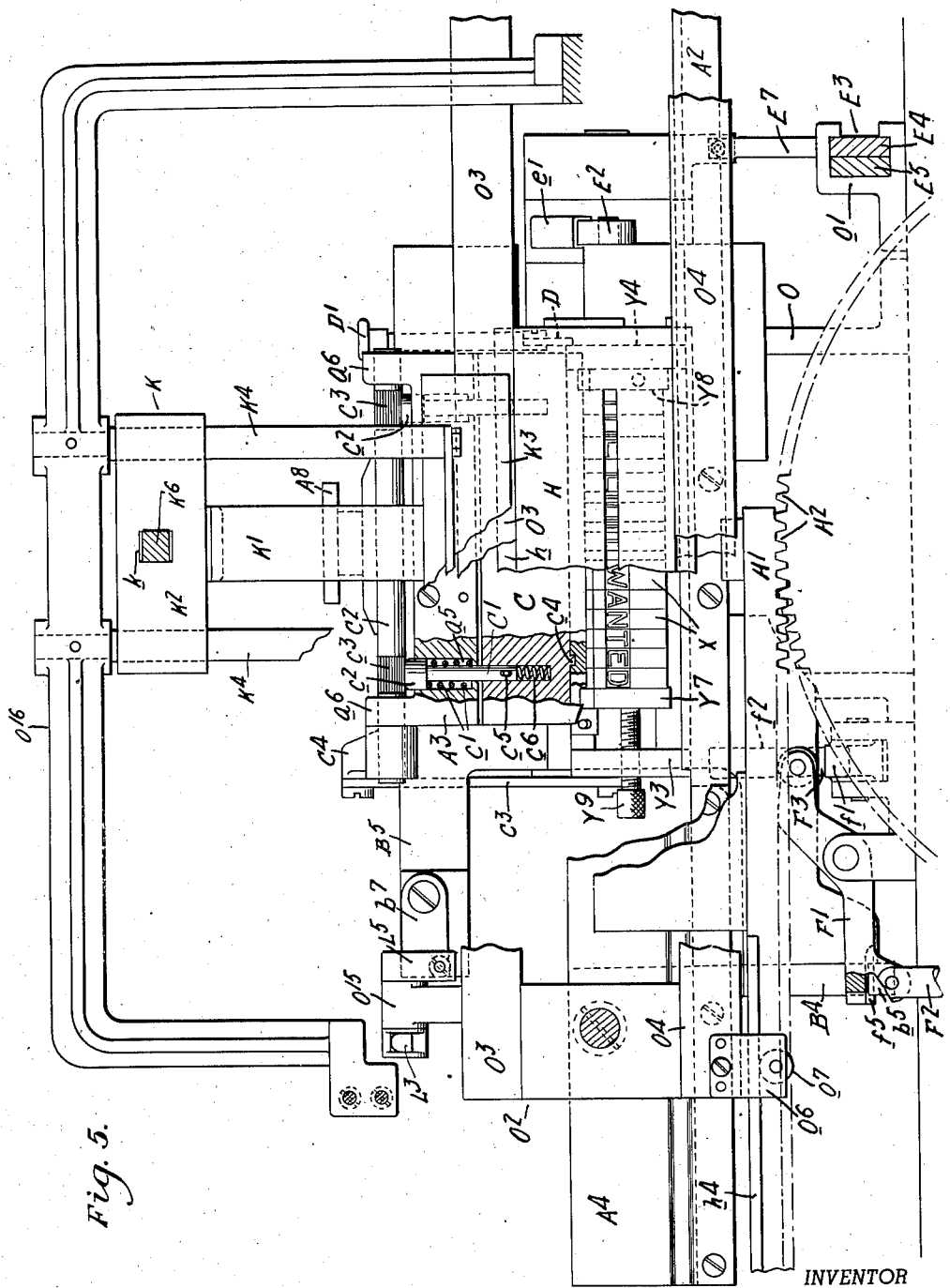

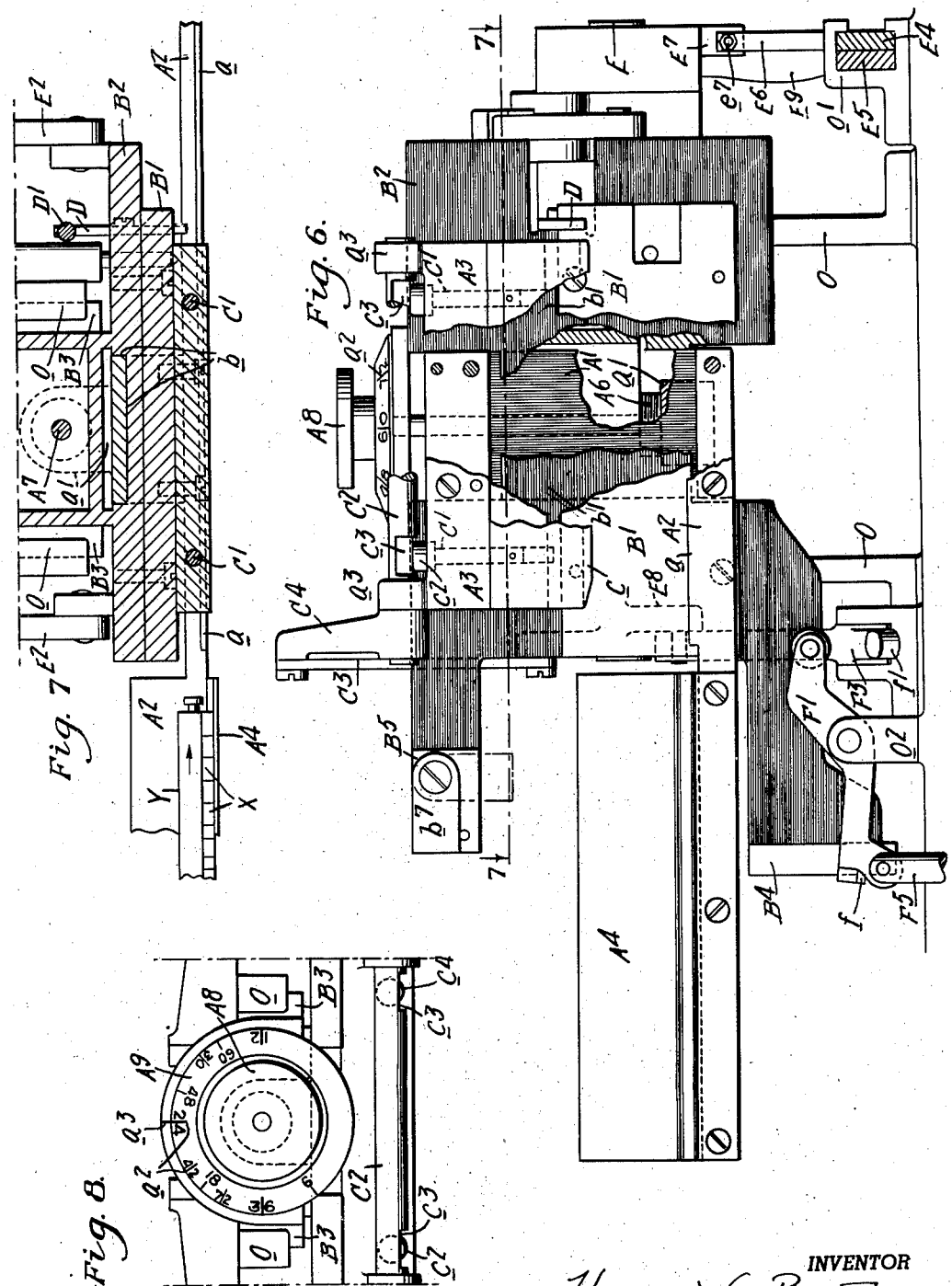

Aug. 26, 1947. H. A. BURT 2,426,166
SLUG CASTING MACHINE USING A HAND STICK
Filed July 16, 1942 12 Sheets-Sheet 6
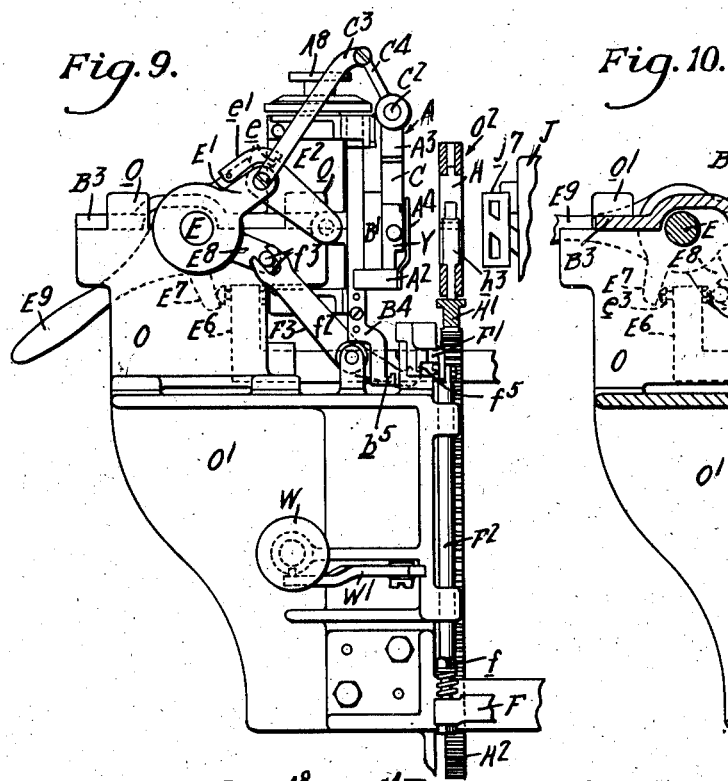
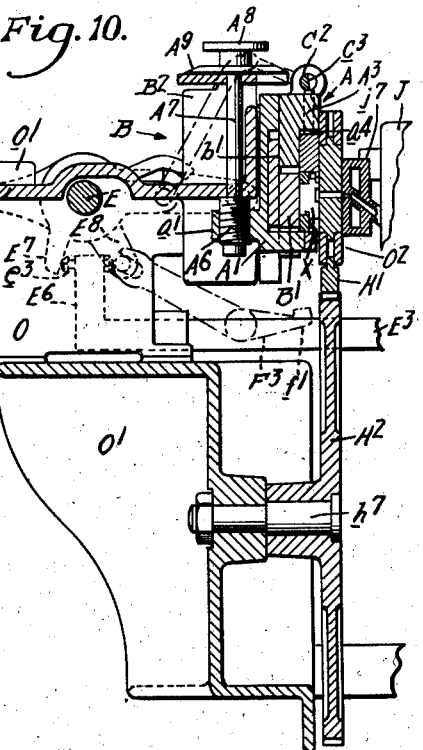
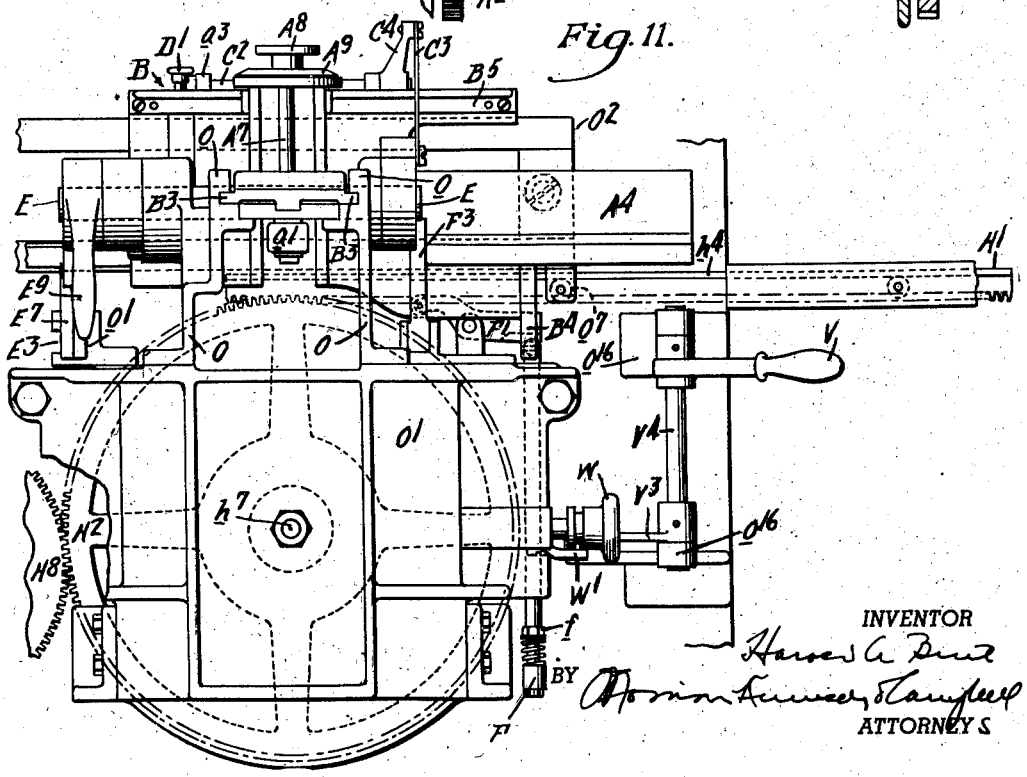
INVENTOR
ATTORNEYS Aug. 26, 1947.  H. A. BURT  2,426,166
SLUG CASTING MACHINE USING A HAND STICK
Filed July 16, 1942   12 Sheets-Sheet 8
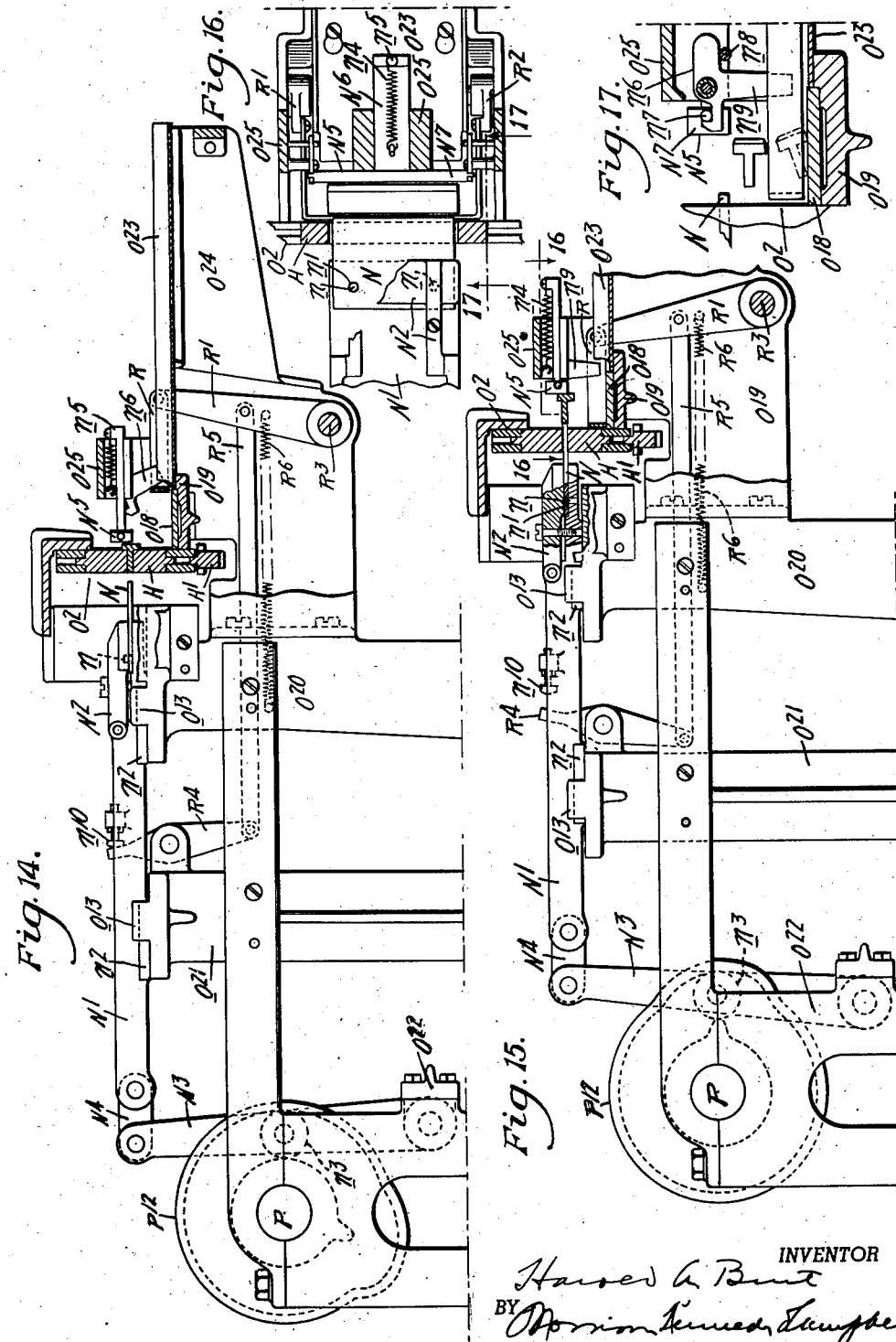

Aug. 26, 1947.  H. A. BURT  2,426,166
SLUG CASTING MACHINE USING A HAND STICK
Filed July 16, 1942  12 Sheets-Sheet 9
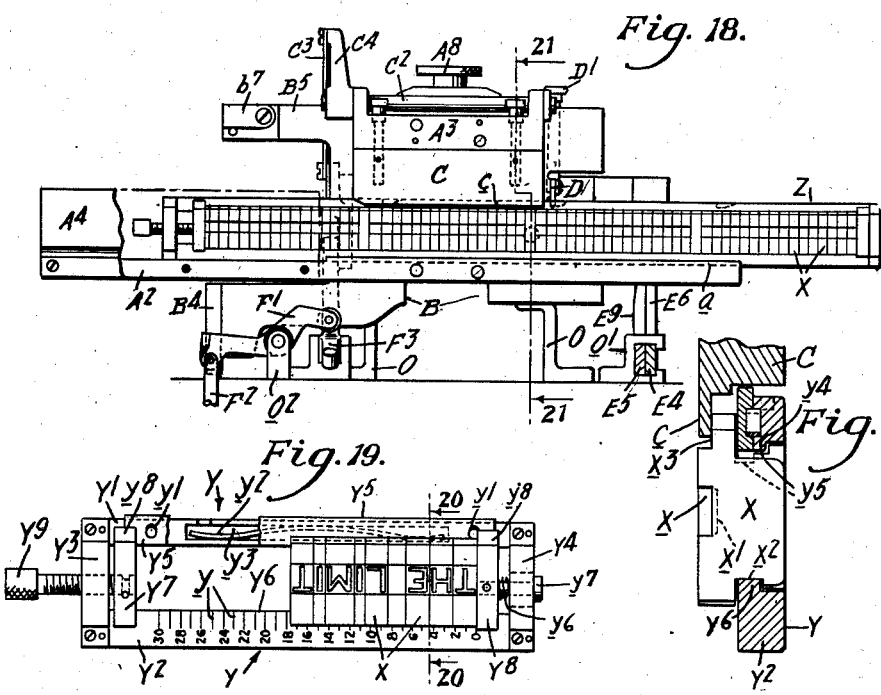
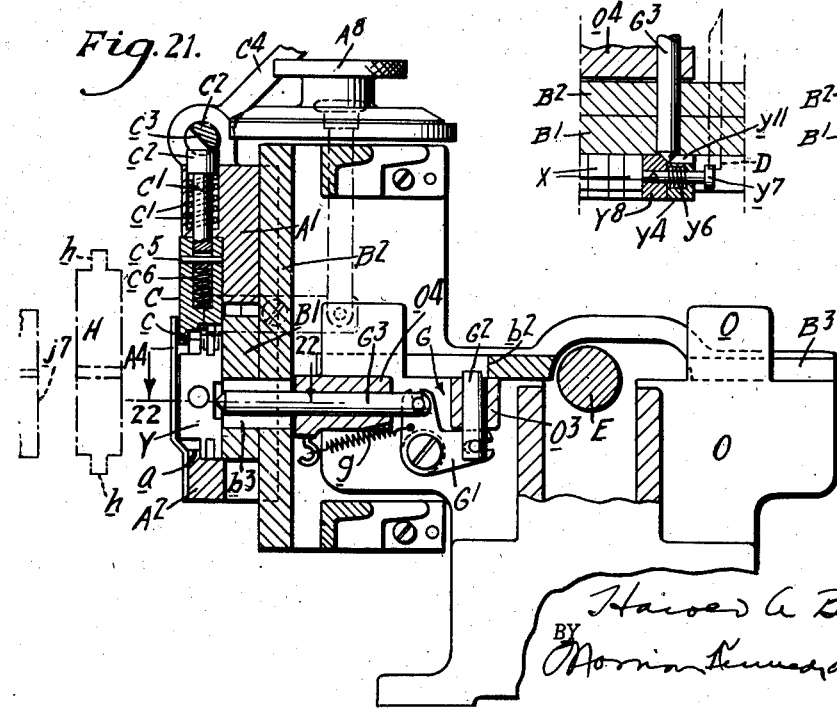
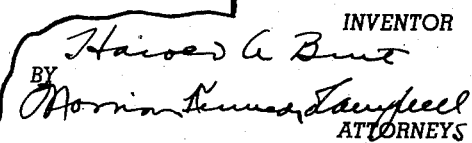
INVENTOR
Harold A. Burt
BY
ATTORNEYS

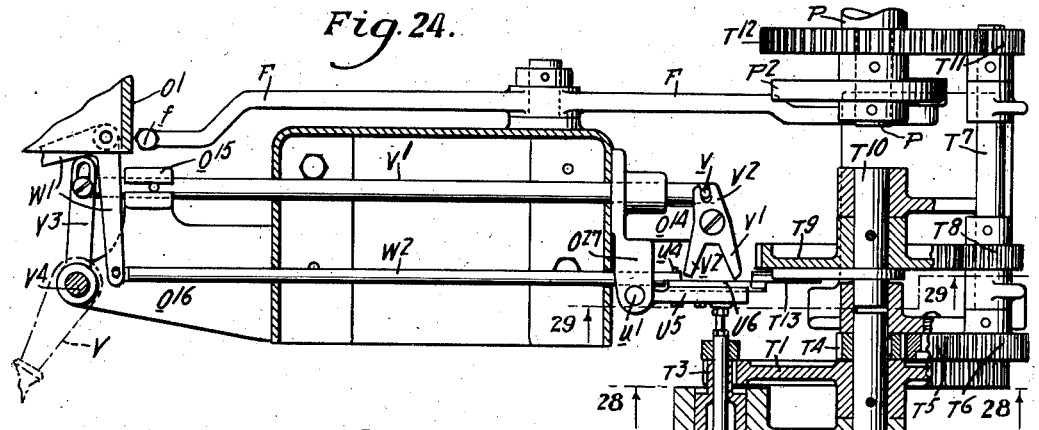
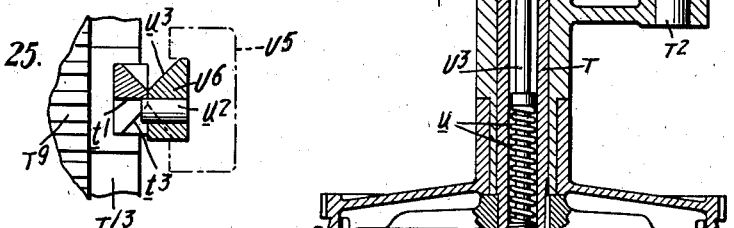
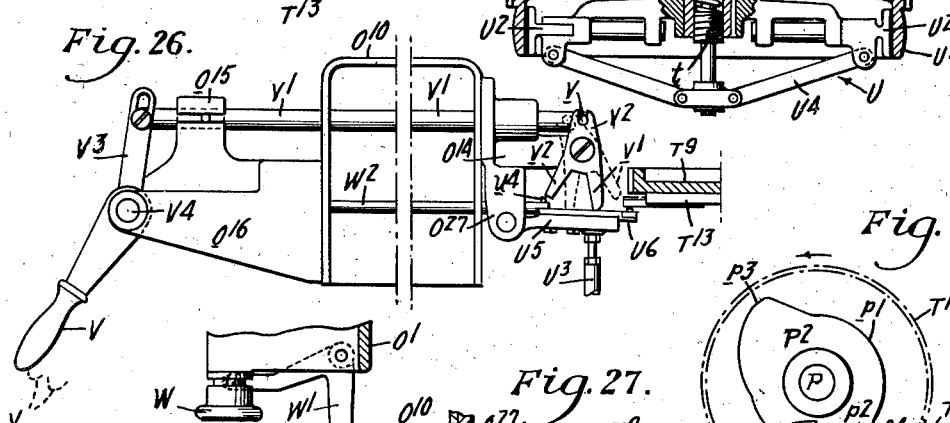
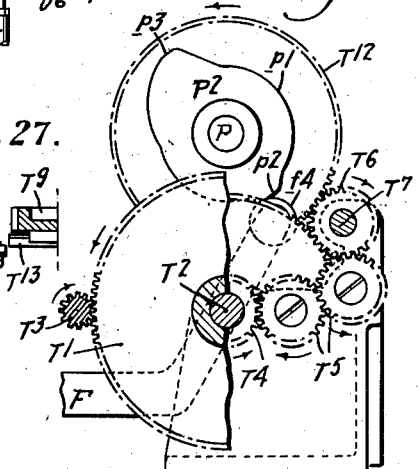
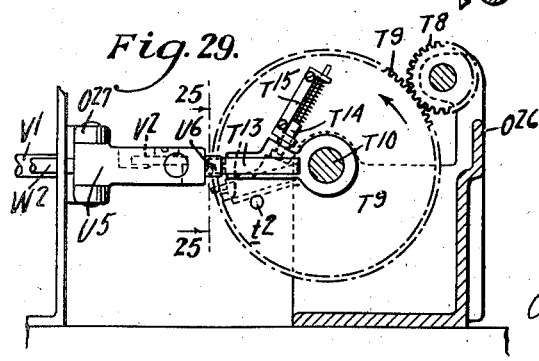

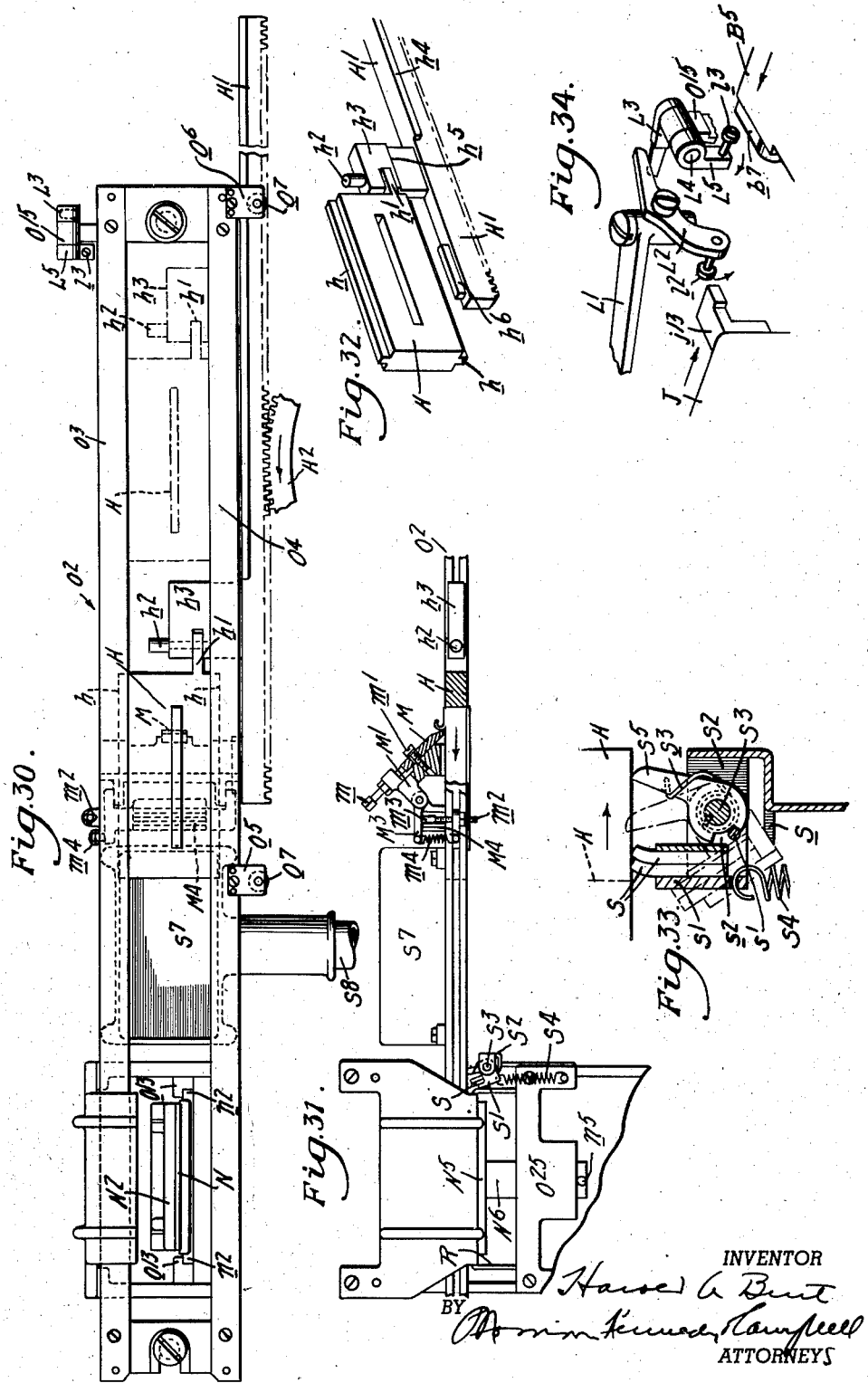

Aug. 26, 1947.   H. A. BURT   2,426,166
SLUG CASTING MACHINE USING A HAND STICK
Filed July 16, 1942   12 Sheets-Sheet 12

INVENTOR
Harold A. Burt
BY
ATTORNEYS

Patented Aug. 26, 1947

2,426,166

UNITED STATES PATENT OFFICE 2,426,166

SLUG CASTING MACHINE USING A HAND STICK

Harold A. Burt, St. Albans, N. Y., assignor to Mergenthaler Linotype Company, a corporation of New York Application July 16, 1942, Serial No. 451,165

27 Claims. (Cl. 199—1)

This invention is directed to an improved complete slug casting machine simple in design and intended to facilitate the production of slugs cast from matrix lines composed in a hand stick.

The machine is equipped with a single slotted mold slidably mounted in horizontal guideways and adapted during each machine cycle of operation to be moved, first in one direction to the casting station, then in the opposite direction to the ejecting station, and finally to a neutral position of rest between these stations where it is subjected to the action of a cooling medium preparatory to the next casting operation. The mold is of less than the standard height, and the matrices, whose characters range in size from 6 pt. to 72 pt., are formed in their casting edges with routing notches of a depth to compensate for the reduced height of the mold, so that the cast slugs will be of the required "type height." In the preferred embodiment illustrated, the width of the mold slot is 12 pt., and the slugs produced therein from matrix lines of greater point sizes will be of the L-shaped or T-shaped variety, their overhanging type bearing portions being cast in the routing notches of the matrices.

Prior to the inauguration of a machine cycle of operation, the hand stick with its composed line of matrices is pushed endwise into a horizontally disposed receptacle and up against a stop which locates the matrix line properly with reference to the end walls of the mold slot. Any matrices that may be tilted edgewise out of their proper vertical position in the line are straightened up as they enter the receptacle so as to insure the required "face alignment" before casting. The receptacle is mounted for vertical adjustment in a suitable support arranged at the casting station and slidably mounted in the machine frame so that it may be moved backwardly and forwardly to carry the composed line to and from the casting position. The adjustments of the receptacle within the support are effected by means of a micrometer screw and dial device carried by the support and adapted to locate the matrix characters of selected point sizes in different positions transversely of the mold slot. The extent of these adjustments in the present machine is determined in units of 6 pt., so that the width of the overhang portions of the T-shaped and L-shaped slugs may be measured in multiples of that unit, thus permitting low slugs of but two thicknesses, namely, 6 pt. and 12 pt., to be used as the only furniture required to properly support the overhang portions regardless of the size of the type characters.

Operation of the sliding line support is controlled from the main drive shaft through the medium of a toggle device which, upon the inauguration of the machine cycle, is straightened out to carry the hand stick rearwardly and to sustain it against the force of the "lock-up" with the mold, the latter meanwhile having been moved from its neutral position to one directly behind the matrix line at the casting station. During the rearward movement of the line support, the matrix characters are aligned horizontally by operation of a vertically movable slide mounted in the hand stick receptacle and arranged to engage an aligning bar located directly above the matrices. The metal pot is thereupon advanced from the rear and the mold pressed thereby firmly against the matrix line preparatory to the descent of the pot plunger and the casting of the slug. After casting, the toggle device is collapsed to restore the line support to its forward position, where the hand stick may be conveniently removed therefrom, and the mold is shifted to the ejecting station past a stationary back knife which trims the rear edge of the slug and brings it to the proper height. As the mold arrives in the ejecting position, it is adapted to condition a wiper device so that the wiper element thereof will be forced against the front face of the mold as the latter, after the ejection of the slug, starts its return movement to neutral position.

The ejection of the slug from the mold is effected by a reciprocatory ejector slide advanced from the rear and which works against the influence of a yielding resistance located directly in front of the mold and adapted to sustain the slug momentarily above a shelf upon which it is deposited when the ejector slide recedes. A transfer element, controlled by the operation of the ejector slide, thereupon engages the slug and delivers it into a trough or galley arranged conveniently at the front of the machine.

Various other features of the machine as well as certain safety devices (one for preventing the operation of the line support unless the hand stick is properly positioned therein, and another to prevent the casting operation if the hand stick is not carried to the casting position) will be fully set forth in the detailed description to follow.

In the accompanying drawings, the improvements have been shown merely in preferred form and by way of example, and obviously many changes and variations may be made therein without departing from the spirit of the invention. It should be understood, therefore, that the invention is not limited to any specific form or embodiment except insofar as such limitations are specified in the appended claims.

Referring to the drawings—

Fig. 5 is a rear elevation, on an enlarged scale, of the hand stick support and adjacent mechanism, certain parts being broken away to show more detail of construction;

Fig. 6 is an elevation similar to Fig. 5 with certain parts removed and others shown in a different position;

Fig. 7 is a horizontal section taken on the line 7—7 of Fig. 6;

Fig. 8 is a detail face view of the dial plate used in adjusting the hand stick receptacle;

Fig. 9 is a side elevation of the hand stick support and adjacent mechanism, showing said support in its forward or normal position;

Fig. 10 is a view similar to Fig. 9 but in vertical section, showing the hand stick in casting relation with the mold;

Fig. 11 is a front elevation of the parts shown in Fig. 9;

Fig. 14 is a side elevation partly in section of the slug ejecting mechanism and transfer devices;

Fig. 15 is an elevation similar to Fig. 14 but showing the ejector slide advanced;

Fig. 16 is a detail horizontal section taken on the line 16—16 of Fig. 15;

Fig. 17 is a detail vertical section, on an enlarged scale, taken on the line 17—17 of Fig. 16;

Fig. 18 is a rear elevation showing a streamer form of hand stick positioned in its support;

Fig. 19 is a side elevation of the smaller or normal form of hand stick, with a matrix line partly composed therein;

Fig. 20 is a vertical section, on an enlarged scale, taken on the line 20—20 of Fig. 19;

Fig. 21 is a vertical section through the hand stick support, showing the matrix aligning bar and the safety detent for locking the support in its forward position;

Fig. 22 is a detail horizontal section, on an enlarged scale, taken on the line 22—22 of Fig. 21;

Fig. 23 is a detail section similar to Fig. 22, but showing the parts in a different position;

Fig. 24 is a horizontal section showing the machine driving mechanism and clutch control devices;

Fig. 25 is a detail section, on an enlarged scale, taken on the line 25—25 of Fig. 29;

Fig. 26 is a fragmentary view showing certain parts of Fig. 24 in a different position;

Fig. 27 is a detail sectional view showing the machine stop device disabled to permit continuous casting;

Fig. 28 is a vertical section taken on the line 28—28 of Fig. 24;

Fig. 29 is a vertical section taken on the line 29—29 of Fig. 24;

Fig. 30 is a front elevation showing the machine front plate, the mold, and its actuating connections;

Fig. 31 is a fragmentary plan view, partly in section, showing the back trimming knife and mold wiper;

Fig. 32 is a detail perspective view of the mold and a portion of its actuating rack bar;

Fig. 33 is a detail horizontal section of the mold wiper, showing it in its active and inactive positions;

Fig. 34 is a fragmentary perspective view of the pump stop control devices;

Figure 37:
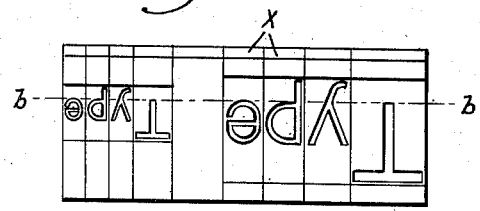
Fig. 37 is a face view of a composed line of the matrices of different fonts and showing their characters located thereon with reference to a common datum line for "base alignment"
Figure 38:
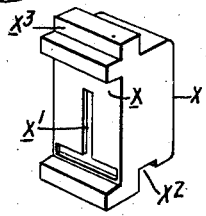
Fig. 38 is a detail perspective view of one of the matrices.

The matrices X (Fig. 38) employed in the present machine are similar to those used in the machine shown and described in the patents to A. J. Stouges Nos. 1,899,648 and 1,980,110, being generally rectangular in shape and formed with relatively deep routing notches $x$ which extend completely across their casting edges. The matrix characters $x^1$ are punched in the bottoms of the routing notches $x$ and have a range in size up to 72 pt. in height. Throughout the several fonts, the characters irrespective of their point size are positioned for "base alignment" with reference to a common datum line $a$—$b$ (Fig. 37), when the matrices are composed in line and supported by their bottom edges.

In composing lines of the usual 30 em length, a hand stick Y is used, which, as shown in Figs. 19 and 20, is rectangular in form and comprises generally the two upper and lower parallel side members $Y^1$, $Y^2$, and the two end walls $Y^3$ and $Y^4$. The lower side member $Y^2$ is provided with a scale $y$ graduated in ems to indicate the length of the matrix lines during composition, and the upper side member $Y^1$ is provided with an aligning bar $Y^5$ which is attached thereto by means of screw and slot connections $y^1$ so that it will be capable of a limited vertical movement into and out of engagement with the upper edges of the matrices. A flat spring $y^2$, arranged to fit in opposed shallow recesses $y^3$ formed respectively in the front face of the upper side member $Y^1$ and the rear face of the aligning bar $Y^5$, sustains the latter yieldingly in its raised position out of contact with the matrices. As the matrices are composed in the hand stick Y, they will be supported on a rail $Y^6$ which rises from the lower side member $Y^2$ and engages in corresponding notches $x^2$ formed in the bottom edges of the matrices. When the line is completely composed, it is clamped endwise in place between a pair of banking blocks or abutments $Y^7$, $Y^8$, by means of a thumb screw $Y^9$, which latter is threaded transversely through the end wall $Y^3$ and connected appropriately with the contiguous abutment $Y^7$. Both abutments, like the matrices, are notched in their bottom edges to engage the rail $Y^6$, but in their upper edges they are formed with additional notches $y^5$ to receive a lip $y^4$ depending from the upper side member $Y^1$, said notches being sufficiently wide and deep to accommodate the aligning bar $Y^5$ when it is pushed downwardly into engagement with the matrices.

For reasons later to appear, the abutment $Y^8$, against which the matrices are composed in line, is adapted to yield a short distance in opposition to a compression spring $y^6$ under the line clamping pressure before it banks against the adjacent end wall $Y^4$, said abutment (see Fig. 19) being provided with a headed pin $y^7$ which projects laterally therefrom through a hole in the end wall $Y^4$ and sustains the abutment in spaced relation therewith.

After a matrix line is properly composed and clamped in the hand stick Y, the latter is pushed from the right (Fig. 3) into a receptacle A comprising generally (Fig. 10) an L-shaped body $A^1$, an elongated base bar $A^2$, and a retaining plate $A^3$ fastened to the vertical portion of the body $A^1$ directly above the base bar $A^2$. To guide the hand stick into the receptacle, the base bar is provided with an upstanding guard plate $A^4$ (Fig. 9); and, beyond said plate, it is formed with a retaining rail $a$ (Fig. 10) arranged to engage the lower side member $Y^2$ of the hand stick. Upon entering the receptacle, which itself is mounted in a support B, the hand stick will be sustained in upright position against a head block $B^1$ of the support by a vertically movable slide bar C (Fig. 6), which bar is formed at its lower edge with a depending lip $c$ arranged to engage corner notches $y^8$ formed transversely in the upper edges of the abutments $Y^7$, $Y^8$ of the hand stick Y (Fig. 19). The lip $c$, as will be noted from Fig. 20, is also adapted to engage corresponding corner notches $x^3$ formed in the upper edges of the matrices so as to insure their face alignment in the hand stick. The head block $B^1$ is secured to an upright portion $B^2$ of the support B (Figs. 6 and 7) and takes the thrust of the lock-up pressure against the matrix line during the casting operation.

The hand stick receptacle A is mounted for vertical adjustment in suitable guideways $b$ (Fig. 1) formed in the head block $B^1$, and the extent of its vertical adjustments is determined in units of 6 pt. for the reasons hereinbefore stated. The adjusting means herein employed (see Fig. 10) includes a micrometer screw $A^6$ fastened to the lower end of a short vertical shaft $A^7$ and threaded into an ear $a^1$ projecting forwardly from the body portion $A^1$ of the receptacle. The shaft $A^7$ is rotatably mounted in the upright portion $B^2$ of the support B and, at its upper end, it is provided with a knob or handle $A^8$ so that the screw $A^6$ may be turned in the appropriate direction to raise or lower the receptacle in the support, as desired. Directly beneath the knob $A^8$, the shaft $A^7$ is further provided with a dial plate $A^9$ having graduated markings $a^2$ (Fig. 8) which are to be read in conjunction with a single mark $a^3$ on an upper surface of the support B (Fig. 6) to indicate the adjustments of the receptacle as they are made. The dial markings correspond to the point sizes of the matrix fonts that may be used within the 72 pt. range, and the pitch of the screw $A^6$ is such that in setting the dial plate for different selected fonts the receptacle will be moved in 6 pt. units to correspondingly different levels.

As shown best in Fig. 10, the retaining plate $A^3$ of the receptacle A fits against the rear wall of a recess $b^1$ formed in the upper edge of the head block $B^1$, and it itself is recessed at $a^4$ to accommodate the slide bar C before alluded to. Said slide bar is mounted and guided on the retaining plate $A^3$ by means of a pair of spaced-apart plunger rods $C^1$ projecting upwardly from the slide through shouldered apertures $a^5$ (Fig. 5) formed in the retaining plate $A^3$. The slide bar C is capable of only a limited vertical movement under control of an overhead rock shaft $C^2$, and it is held yieldingly in its raised position against the upper wall of the recess $a^4$ by a pair of compression springs $c^1$ (Fig. 5) seated beneath head portions $c^2$ of the plunger rods $C^1$ in the shouldered apertures $a^5$. The rock shaft $C^2$ is mounted in bearing lugs $a^6$, rising from the opposite ends of the retaining plate $A^3$, and is formed with two cam surfaces $c^3$ engaging the head portions of the plunger rods, which latter for this reason project above the upper surface of the retaining plate. The arrangement is such that when the rock shaft is given a partial turn in one direction, the slide bar C will be pushed downwardly against the influence of the springs $c^1$, and when it is given a similar turn in the opposite direction, the springs will raise the bar to its former position. Operation of the rock shaft $C^2$ is effected automatically prior to the casting operation by means presently to be described.

In its downward movement, the bar C is adapted to engage the aligning bar $Y^5$ of the hand stick Y and force it in the same direction into engagement with the matrices of the composed line so as to insure their alignment on the rail $Y^6$ preparatory to the casting operation. To prevent possible damage to the parts at this time in the event that positive resistance should be presented to the slide bar C, the plunger rods $C^1$ are attached to the said bar by means of pin and slot connections $c^5$ so as to permit a slight relative movement between these parts against the influence of cushioning springs $c^6$ located below the rods $C^1$ in the slide bar C. As a further precautionary measure and to prevent the removal of the hand stick from the receptacle A until after the casting operation when the slide bar C is again raised, the latter (see Fig. 5) is provided with a stud $c^4$ which protrudes from its lower edge and is arranged to engage a corresponding recess formed in the upper side member of the hand stick Y.

To locate the hand stick Y endwise in the proper position in the receptacle A, the support B is equipped with a stop member D which is arranged to engage the leading end of the hand stick Y as the latter is pushed into the receptacle. The stop member is adapted also to function in connection with a longer and so-called "streamer" hand stick Z, being pivotally mounted in the support B so that it may be rocked from its active position by operation of a push rod $D^1$ (Fig. 5) against the influence of a spring (not shown). The hand stick Z (Fig. 18), except in length and for three spaced apart notches $z$ formed in its upper side bar, is identical with the hand stick Y, and when it is pushed into the receptacle A, its leading end will engage the stop member D and the first section of the composed line will be properly located in the casting position. Thereafter, by depressing the push rod $D^1$ to raise the stop member out of the path of the hand stick, and then advancing the latter in stages, or notch by notch, each successive line section may be similarly located in the casting position by the engagement of the stop member with the appropriate notch $z$.

As shown in Figs. 3, 9, 10 and 11, the hand stick support B is slidably mounted in a fixed upright bracket O presenting fore and aft guideways $o$, which engage the opposite edges of a horizontally disposed portion $B^3$ of the support. During the machine cycle, the support B is moved first backwardly to carry the hand stick and composed line to the casting position, and later (after the casting operation) it is restored to its forward position, where the hand stick may be conveniently removed and another substituted therefor. Operation of the support is effected by rotation of a horizontal rock shaft E mounted in the bracket O and provided at its opposite ends with a pair of rearwardly extending arms $E^1$ which are connected with the upright portion $B^2$ of the support through the medium of a corresponding pair of toggle links $E^2$. When the rock shaft E is given a partial turn in a clockwise direction (Fig. 9), the toggles will be straightened out to shift the support B rearwardly, and when the said shaft is given a similar turn in the opposite direction, the toggles will be collapsed to move the support forwardly. As the toggle members $E^1$, $E^2$ reach "dead center," the support B will be located and locked in the casting position so as to withstand the lock-up pressure exerted against the matrix line. To prevent overthrow of the toggles and thus avoid the danger of a metal squirt that might otherwise result, the toggle members $E^1$ and $E^2$ are formed with opposed banking surfaces $e$ which are brought together to arrest movement on the dead center line. Since these surfaces open and close during the operation of the machine, they are, for purposes of safety, covered by a guard plate $e^1$ fastened to the toggle members $E^1$.

Figure 1:
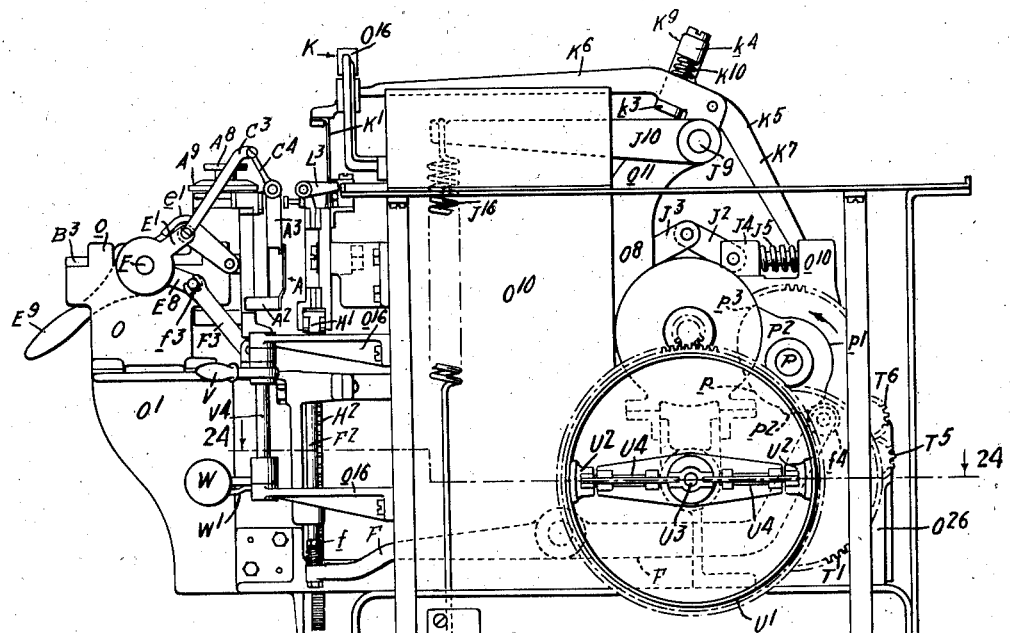
Fig. 1 is a side elevation of the improved machine, showing the parts in their normal position of rest.
Figure 2:
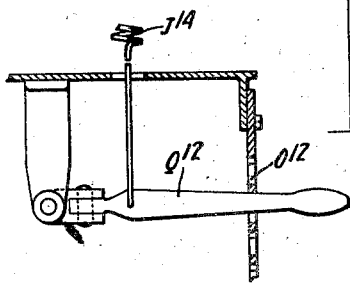
Fig. 2 is a detail sectional view showing the adjusting device for the pot plunger spring.

In the preferred embodiment illustrated, the clockwise and counter-clockwise movements of the rock shaft E are effected through separate trains of connections from individual edge cams $P^1$ and $P^2$ mounted on the main shaft P of the machine. One of these trains of connections (that for straightening out the toggle members) includes a fore and aft slide bar $E^3$ (Figs. 3 and 4) mounted in fixed guide blocks $o^1$ and comprising two telescopic members $E^4$, $E^5$ arranged face to face and capable of a relative longitudinal movement against the influence of a compression spring $e^2$. The member $E^4$, at its front extremity, is formed with an upstanding finger $E^6$ provided with a set screw $e^3$ arranged to engage the rear edge of a short crank arm $E^7$ depending from the left hand end (Fig. 11) of the rock shaft E: whereas the member $E^5$, at its rear extremity, is provided with an anti-friction roller $e^4$ which is disposed in the path of an offset cam member Q secured to the edge cam $P^1$. The spring $e^2$ is mounted on a supporting guide rod $e^5$ and is arranged between lugs $e^6$ and $e^7$ projecting laterally from the two members $E^4$ and $E^5$, respectively, so as to hold the bar $E^3$ in its extended condition and at the same time permit it to be collapsed in case of interference in the operation of any of the parts it controls. The guide rod $e^5$ is fastened in the lug $e^6$ and extends therefrom through the spring $e^2$ and lug $e^7$ to receive a collar $e^8$ which banks against the lug $e^7$ and thus determines the length of the slide bar $E^3$. The other train of connections (that for collapsing the toggle members $E^1$, $E^2$) includes a main fore and aft rocking lever F (Fig. 1) mounted in the machine frame, a smaller secondary lever $F^1$ pivoted to a lug $o^2$ rising from the top surface of a fixed front bracket $O^1$ (Fig. 11), and an intermediate vertically disposed slide rod $F^2$ connected at its upper end to one arm of the secondary lever $F^1$ and having its lower extremity located in operative relation with a spring buffer bolt $f$ mounted in the front end of the main fore and aft lever F. A bell crank lever $F^3$, disposed at right angles to the secondary lever $F^1$ and pivoted between upstanding ears of the bracket $O^1$ (Figs. 9, 10 and 11), completes the train of connections, the shorter member $f^1$ of the bell crank extending rearwardly from its pivotal axis so as to underlie the other arm of the secondary lever, and the longer member $f^2$ thereof being connected by means of a pin and slot $f^3$ to a crank arm $E^8$ fastened to the right hand end of the rock shaft E. At its rear end, the main lever F is provided with an anti-friction roller $f^4$ arranged to track upon the edge cam $P^2$ which, as shown in Fig. 1, presents concentric low portions $p$, $p^1$, a slightly raised concentric shoe portion $p^2$, and a high portion $p^3$.

The operation of the support B, through the connections just described, should now be clear: Shortly after a cycle of operation is inaugurated, the cam member Q of the cam $P^1$ will engage the roller $e^4$ at the rear end of the fore and aft slide bar $E^3$ and push the latter forwardly from the position indicated in Fig. 9 to that indicated in Fig. 10. As a result and through the engagement of the upstanding finger $E^6$ at the front end of the bar with the crank arm $E^7$, the rock shaft E will be turned in the appropriate direction to straighten out the toggle members $E^1$, $E^2$ and shift the support backwardly in its guideways $o$ to the casting position. Immediately after the casting operation, the cam roller $f^4$ of the fore and aft lever F is adapted to ride from the concentric low portion $p$ of the cam $P^2$ onto the high portion $p^3$ thereof so as to cause the lever F to raise the slide rod $F^2$ and, through the levers $F^1$ and $F^3$, turn the rock shaft E in the other direction to collapse the toggle members and thus restore the support B to its original and forward position.

For purposes of testing the operation of the support while the machine is at rest, the rock shaft E is further provided with a hand lever $E^9$ by means of which the toggles may be collapsed and extended as desired. However, to avoid the danger of a metal squirt that might result from an inadvertent operation of the hand lever during the casting period, it is proposed to positively lock the support B at such times against forward movement, it being understood that while the cam $P^1$, through the medium of the fore and aft slide bar $E^3$, is adapted to hold the toggles in their extended condition, said bar because of its yieldability cannot in itself prevent a collapsing of the toggle members $E^1$, $E^2$ by the hand lever. To that end, the secondary lever $F^1$ is formed with a depending lip $f^5$ (Figs. 5 and 9) adapted, when the support B is moved to casting position, to engage in a corresponding groove $b^5$ formed at the lower end of a bracket plate $B^4$ secured to the right hand side of the support. Normally, the lip $f^5$ of the lever $F^1$, as shown in Fig. 9, is sustained in a position above the groove $b^5$ by the vertical slide rod $F^2$, which at the time is held in a slightly raised position by the lever F through the engagement of its cam roller $f^4$ with the shoe portion $p^2$ of the cam $P^2$. At the proper moment, however, during the rotation of the shaft P, the roller $f^4$ is adapted to ride off the shoe portion $p^2$ onto the low portion $p$ of the cam, so that the rod $F^2$ may drop sufficiently to lower the lip $f^5$ into interlocking engagement with the groove $b^5$. Thereafter, and as the roller $f^4$ starts up the high portion $p^3$ of the cam to collapse the toggle, the lip $f^5$ will be disengaged from the groove $b^5$ to permit the return movement of the support.

It is further proposed to lock the support B against operation unless the matrix line has been properly clamped in the hand stick and the latter is properly positioned endwise in the receptacle A against the stop member D. For this purpose, the front bracket O (see Fig. 21) is equipped with a detent G arranged directly behind the upright portion of the support B and comprising generally a small bell crank lever $G^1$, a vertically disposed locking pin $G^2$ connected to one arm of the lever $G^1$, and a fore and aft actuating rod $G^3$ connected to the other arm of said lever. The locking pin $G^2$ and the rod $G^3$ are slidably mounted in fixed bearings $o^3$ and $o^4$ of the bracket $O^1$ and are held resiliently in their individual active positions by a pull spring $g$ attached to the lever $G^1$ and anchored in the bracket $O^1$. The locking pin $G^2$ projects slightly above its bearing $o^3$ so as to engage, from behind, a shoulder $b^2$ formed in the horizontal portion of the support B; and the actuating rod $G^3$ also projects beyond its bearing $o^4$ so that it may control the movements of the locking pin through the lever $G^1$, the arrangement of the parts being such that, when the rod is pushed forwardly against the influence of the spring $g$, the locking pin $G^2$ will be pulled downwardly out of the path of the shoulder $b^2$ to release the support and, when pressure on the rod is relieved, the spring will be allowed to raise the pin to its locking position behind the shoulder. The projecting portion of the rod $G^3$ is arranged in a hole $b^3$ drilled transversely through the upright head portion of the support B, and for reasons about to appear, the free end of the rod is tapered off at 45° and adapted, in the normal or forward position of the support, to protrude slightly beyond the rear face of the head block $B^1$ into the path of the hand stick Y. As shown in Figs. 22 and 23, the leading end wall $Y^4$ of the hand stick is formed with a clearance recess $y^{11}$ and the adjacent abutment $Y^8$ is formed with an aligned beveled cut $y^{10}$, which latter is adapted, as the hand stick is pushed against the stop member D, to engage the tapered end of the rod $G^3$ and cam the latter forwardly to release the support in the manner just stated. However, if the matrix line, through carelessness or oversight, should not be properly clamped in the hand stick, the abutment $Y^8$ would then occupy the position shown in Fig. 19, in spaced relation to the end wall $Y^4$, and as a result fail to actuate the rod $G^3$, the parts being so related that the end wall would engage the stop member D before the abutment engaged the rod G.

Operation of the rock shaft $C^2$, for effecting the vertical movements of the slide bar C in the receptacle A, is controlled from the rock shaft E through the medium of a pair of links $C^3$ and $C^4$ (see Figs. 9 and 10), the link $C^3$ being pivotally connected to the right hand arm or toggle member $E^1$ of the rock shaft E (Fig. 3), and the link $C^4$ being fastened to the contiguous end of the rock shaft $C^2$. These links are so disposed that, as the toggles are extended to advance the support B to the casting position, the rock shaft $C^2$ will be turned in the appropriate direction to depress the slide bar C in the manner already described and thus insure the vertical alignment of the matrices X on the horizontal rail $Y^6$ of the hand stick preparatory to the casting operation. Thereafter, and as the toggles are collapsed to retract the support, the rock shaft $C^2$ will be turned by the links $C^3$, $C^4$ in the opposite direction and allow the slide bar C to rise under the influence of the springs $c^1$ to its original position.

As previously stated, the machine is equipped with a single slotted mold H (Figs. 30 to 32) which is slidably mounted for horizontal movement, between the casting and ejecting stations, in an elongated rectangular front plate $O^2$ bolted to the machine frame. The front plate $O^2$ presents upper and lower parallel guide members $O^3$, $O^4$ which are grooved longitudinally to accommodate tongues $h$ formed on the opposite sides of the mold, and which sustain the mold in a horizontal upright position at all times. The mold H is also formed with an ear $h^1$ which projects from the right end thereof and is connected by means of a coupling pin $h^2$ with an upstanding portion $h^3$ of a long rack bar $H^1$ arranged directly beneath the lower guide member $O^4$. The rack bar $H^1$, like the mold, receives its support from the front plate $O^2$ and is movable endwise in opposite directions during the machine cycle to shift the mold to different positions therein. Its means of support, as shown in Fig. 30, include two spaced apart brackets $o^5$, $o^6$ depending from the lower guide member $O^4$ and provided each with a pair of anti-friction rollers $o^7$ which engage overhanging flanges $h^4$ of the rack bar. In order to insure smoothness in the operation of the rack bar, it is slidably connected with the lower guide member $O^4$ in the vicinity of the mold, the upstanding portion $h^3$ of the rack bar being recessed at $h^5$ (Fig. 32) to fit against the member $O^4$, and the latter being formed in its lower edge with a longitudinal groove to accommodate a relatively short tongue $h^6$ projecting upwardly from the rack bar at a point adjacent the upstanding portion $h^3$.

Figure 3:
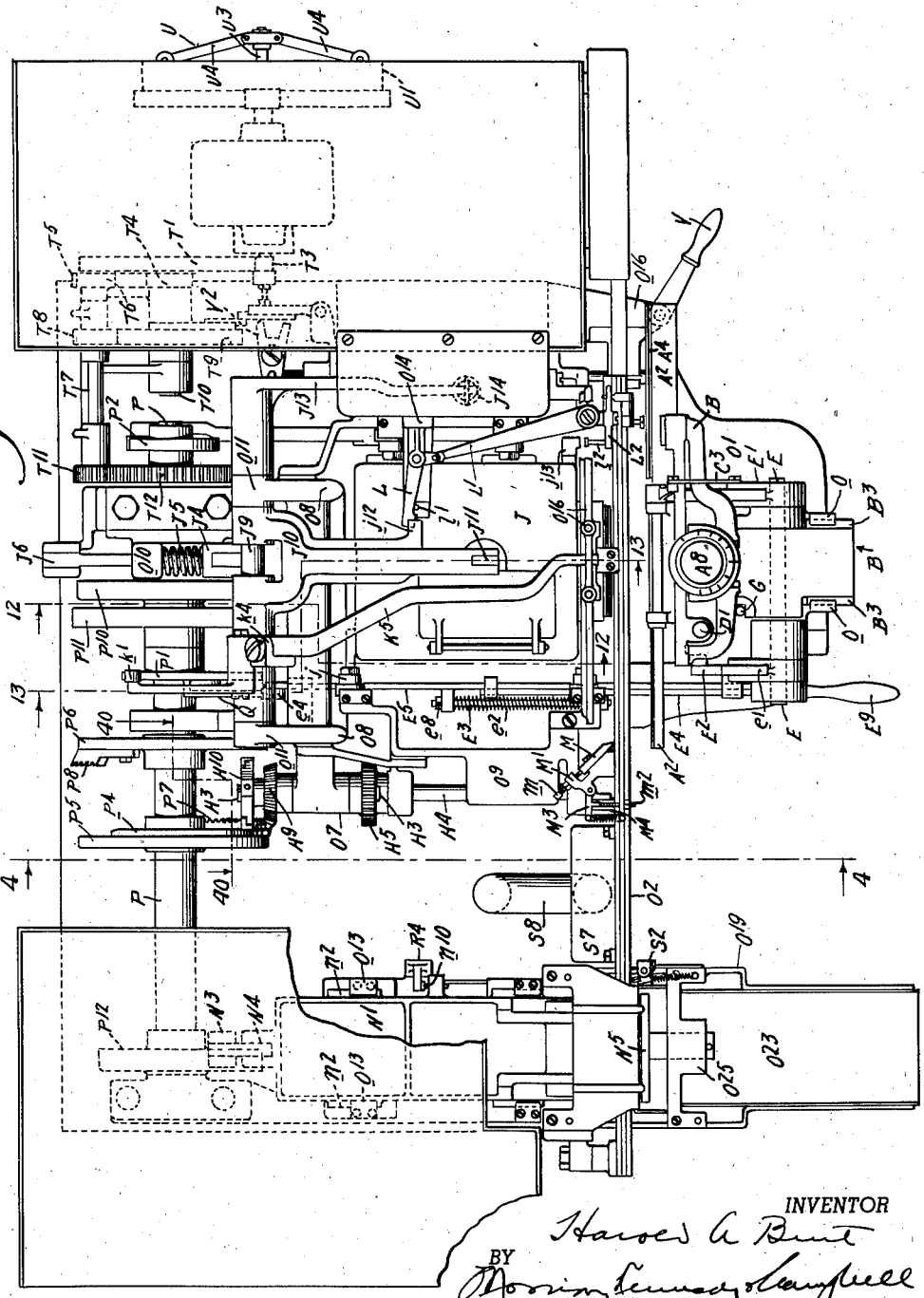
Fig. 3 is a top plan view of the machine.
Figure 4:
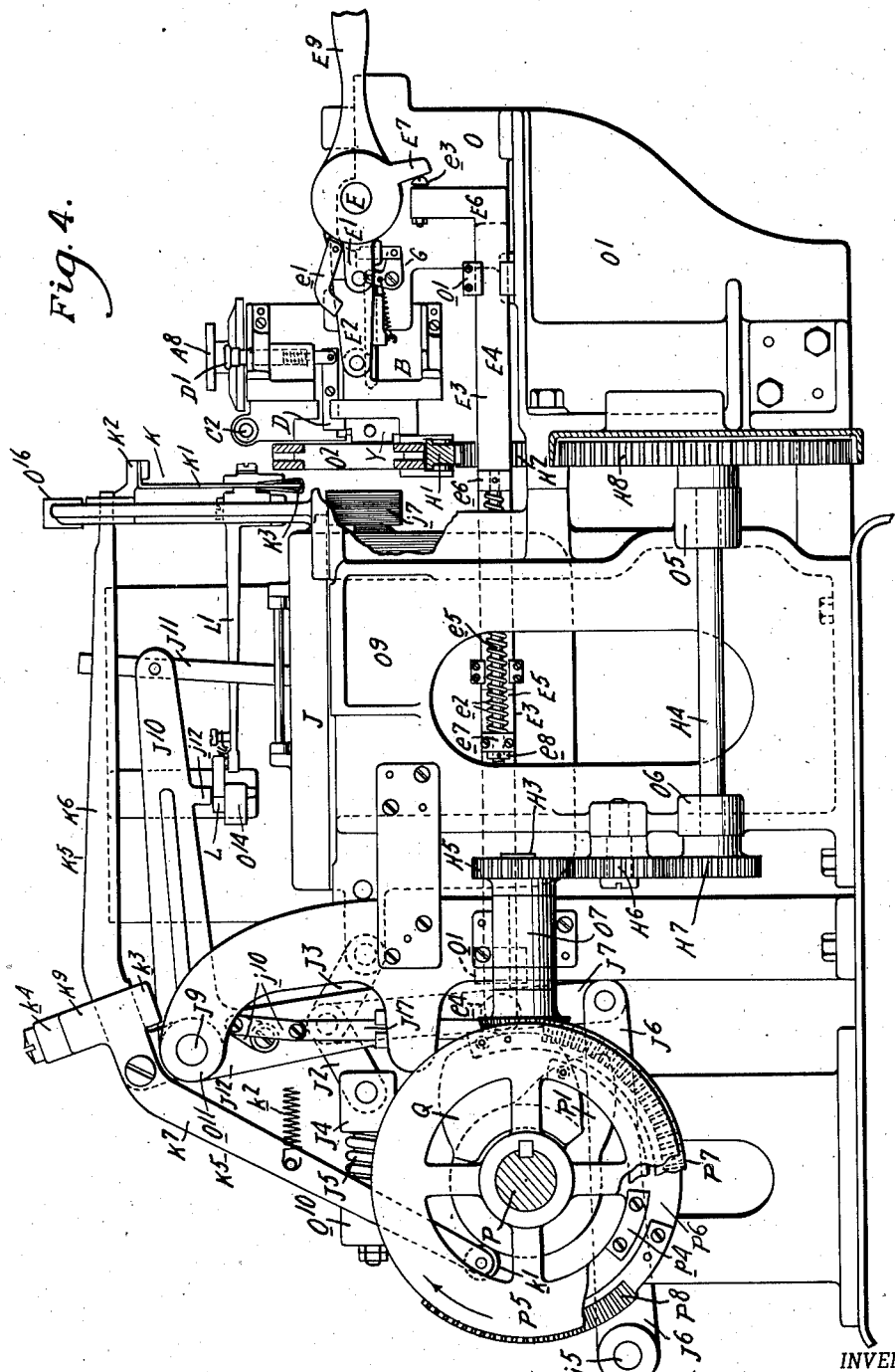
Fig. 4 is a vertical section taken approximately on the line 4—4 of Fig. 3.

The reciprocatory movements of the mold H and rack bar $H^1$ are effected by a large gear $H^2$ which meshes with the rack bar and is mounted below the same on a fixed stub shaft $h^7$. During the machine cycle of operation the gear $H^2$ is rotated periodically, first in a clockwise direction to shift the mold toward the right to the casting station, then in the opposite direction to shift it toward the left to the ejecting station, and finally again in a clockwise direction to shift the mold to a position of rest alongside the ejecting station. As best shown in Fig. 4, the rotary movements of the gear $H^2$ are controlled from the main shaft P through intervening reducing gear mechanism, the latter including a short fore and aft drive shaft $H^3$ aligned with the shaft P, and a longer fore and aft lay shaft $H^4$ driven from a spur gear $H^5$ fastened to the front end of the shaft $H^3$ and connected thereto by gears $H^6$ and $H^7$. The shaft $H^4$ is journaled in front and rear bearings $O^5$, $O^6$ of the machine frame and provided with a gear wheel $H^8$ which is arranged adjacent the front bearing $O^5$ in mesh with the larger gear $H^2$ (see Fig. 11). The drive shaft $H^3$ is mounted in a suitable bearing block $O^7$ secured to a heavy stand bracket $O^8$ and is rotated by means of a bevel gear $H^9$ fastened to its rear end and arranged between a pair of spaced apart discs $P^5$, $P^6$ keyed to the main shaft P (Figs. 3 and 4). The disc $P^5$ is provided with a gear segment $P^7$ adapted during certain stages of the machine cycle, and through its engagement with the bevel gear $H^9$, to turn the shaft $H^3$ in one direction, and the disc $P^6$ is provided with a gear segment $P^8$ adapted during another stage of the cycle to engage said gear and turn the shaft $H^3$ in the opposite direction, the size of the individual segments and their relative angular positions on the discs being such as to impart the rotary movements to the large gear $H^2$ and operate the mold H in the manner above described. In this connection, it may be stated by way of explanation that, at the last stage of a machine cycle, the segment $P^7$ engages the bevel gear $H^8$ so as to shift the mold H the short distance from the ejecting position to its neutral position and hold it there as the machine comes to rest, the size of the segment $P^7$ being such that, at the first stage of the next machine cycle, it will also function to shift the mold to the casting station.

Figure 40:
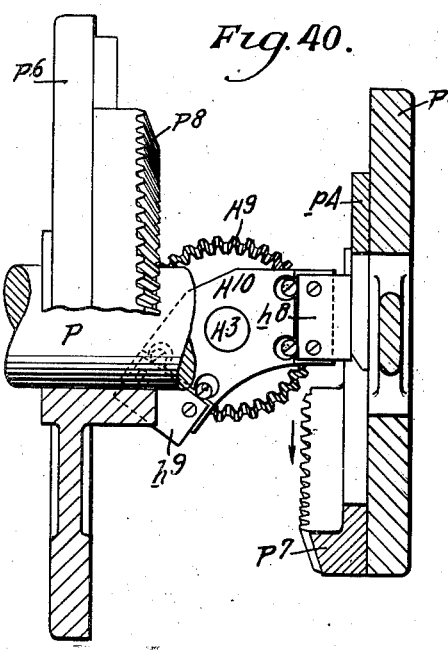
Fig. 40 is a detail view, on an enlarged scale, showing the stop device for the gear shaft which operates the mold.

To locate and hold the mold H against endwise displacement in both the casting and ejecting positions, the drive shaft $H^3$ is further provided with an angular collar member $H^{10}$ arranged directly behind the gear $H^9$ and equipped with a pair of banking blocks $h^8$, $h^9$ adapted, as the gear segments $P^7$ and $P^8$ pass out of mesh with the gear $H^9$, to engage a finished raised surface $p^4$ formed on the inner face of the disc $P^5$ so as to lock the shaft $H^3$ against rotation during the casting and ejecting periods. For a clearer conception of the arrangement, reference is directed to Fig. 40 wherein the segment $P^7$, for shifting the mold to the casting position, is shown as having just passed out of mesh with the gear $H^9$ and the block $h^8$ as having properly engaged the finished surface $p^4$ in order to lock the shaft $H^3$ against rotation until the gear segment $P^8$, for shifting the mold to the ejecting position, is brought into engagement with the gear $H^9$. As the segment $P^8$ breaks its engagement with the gear $H^9$, the block $h^9$ will function in similar fashion until the gear segment $P^7$ again engages the said gear to shift the mold to its neutral position.

Upon the arrival of the mold H in the casting position, the support B will have started its backward movement to present a matrix line composed in the hand stick Y to the front face of the mold. A metal pot J is then advanced from the rear against the back of the mold and presses it against the matrices preparatory to the descent of the pot plunger $J^1$ and the casting of the slug. Thereafter the pot recedes and the support B moves forwardly so that the mold will be free to be shifted to the ejecting position where the slug is pushed from the mold by mechanism presently to be described.

Figure 12:
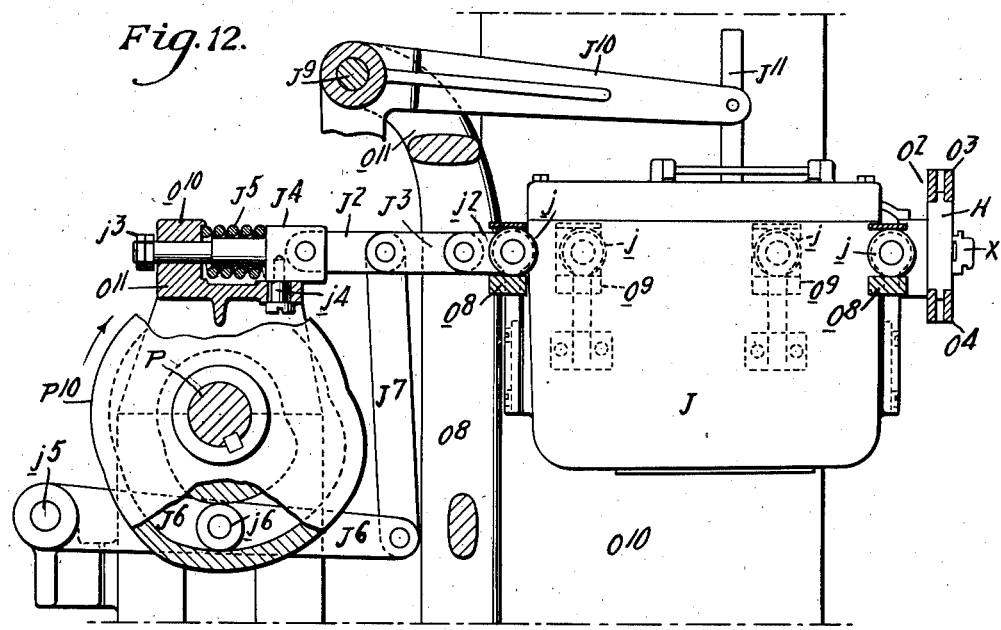
Fig. 12 is a vertical section taken on the line 12—12 of Fig. 3, showing the metal pot in casting position and the control mechanism therefor.

The metal pot J (see Figs. 3, 12 and 13) is arranged between stationary upright columns $O^9$, $O^{10}$ of the machine frame and is supported for fore and aft movement in a horizontal plane by means of rollers $j$, $j^1$ mounted on the the opposite sides of the pot and tracking upon individual ledges $o^8$, $o^9$ projecting inwardly from the columns $O^9$, $O^{10}$, respectively. The movement of the metal pot is effected by extending and collapsing a toggle device comprising a pair of links $J^2$ and $J^3$, the former being anchored to a slide bolt $J^4$, and the latter being connected with an ear $j^2$ projecting rearwardly from the pot casing. The slide bolt $J^4$ (Fig. 12) is mounted and guided in a fixed bracket $O^{11}$ and is capable of a limited endwise movement against the influence of a strong compression spring $J^5$ which surrounds the shank of the bolt and reacts against an abutment $o^{10}$ of the bracket. A pair of adjustable banking nuts $j^3$, threaded on the rear end of the bolt $J^4$, regulates the power of the spring, and a headed pin $j^4$ depending from the head of the bolt through a slot in the bracket $O^{11}$ stabilizes its movements.

Operation of the toggle device is controlled from a face cam $P^{10}$ (Fig. 12) mounted on the main shaft P and positioned directly behind the metal pot, the intervening connections including a fore and aft lever $J^6$ located below the shaft P and hingedly mounted at its rear end on a fixed cross pin $j^5$. About midway its length, the lever $J^6$ is provided with an anti-friction roller $j^6$ engaging in a groove $p^5$ of the cam $P^{10}$, and at its front end it is operatively connected with the toggle by a vertical link $J^7$, the contour of the groove $p^5$ being such that, during each revolution of the cam and prior to the casting operation, the lever $J^6$ will be swung downwardly to extend the toggle and thus push the pot forwardly from the position shown in Fig. 4 to that shown in Fig. 12. After the descent of the pot plunger $J^1$ and the casting of the slug, the lever will be swung upwardly to collapse the toggle and restore the pot to its original position. As the toggle is completely extended, the slide bolt $J^4$ is adapted to yield slightly in opposition to the spring $J^5$ so that the latter may determine the "lock-up" pressure applied against the back of the mold H by the mouthpiece $j^7$ of the metal pot. It will be noted that this pressure is applied directly in line with the mold, thus insuring the proper lockup of the parts.

The pot plunger $J^1$ (Fig. 13) is mounted for vertical movement in a cylindrical pot well $J^8$ of the pot crucible, and is controlled from the main shaft P through a horizontal rock shaft $J^9$ and a heavy bellcrank lever $J^{10}$ made fast to said shaft. One arm of the lever $J^{10}$ projects forwardly from the shaft $J^9$ to establish a connection with the pot plunger rod $J^{11}$, and the other arm $J^{12}$ thereof projects downwardly from the shaft in operative relation with an edge cam $P^{11}$ arranged adjacent the pot cam $P^{10}$ and engaging a roller $j^8$ carried at the lower end of the arm $J^{12}$. The rock shaft $J^9$ is rotatably mounted in spaced apart bearings $o^{11}$ at the upper end of the stand bracket $O^8$, and at the extreme right (Fig. 3) it is provided with a fore and aft crank arm $J^{13}$. A strong pull spring $J^{14}$ (Fig. 1), looped at the top over the front end of the crank arm and adjustably connected at the bottom by means of a horizontal lever $o^{12}$ with a fixed anchor plate $O^{12}$, holds the cam roller $j^8$ of the lever $J^{10}$ yieldingly against the cam $P^{11}$. During a machine cycle and as the roller $j^8$, by rotation of the cam shaft P, rides from the high portion $p^6$ of the cam across a sharp declination $p^7$ thereof, the pull spring $J^{14}$ is adapted to effect the descent of the plunger $J^1$ and the casting of the slug, the molten type metal at such time being forced upwardly through the throat $J^{15}$ and mouthpiece $j^7$ of the pot into the mold H and against a composed line of matrices in the hand stick Y. Just before the mouthpiece of the metal pot breaks its contact with the back of the mold and as the roller $j^8$, by continued rotation of the shaft P, rides from the low to the high portion of the cam $P^{11}$, the plunger will be raised and the parts restored to their normal position preparatory to the next casting operation.

Figure 13:
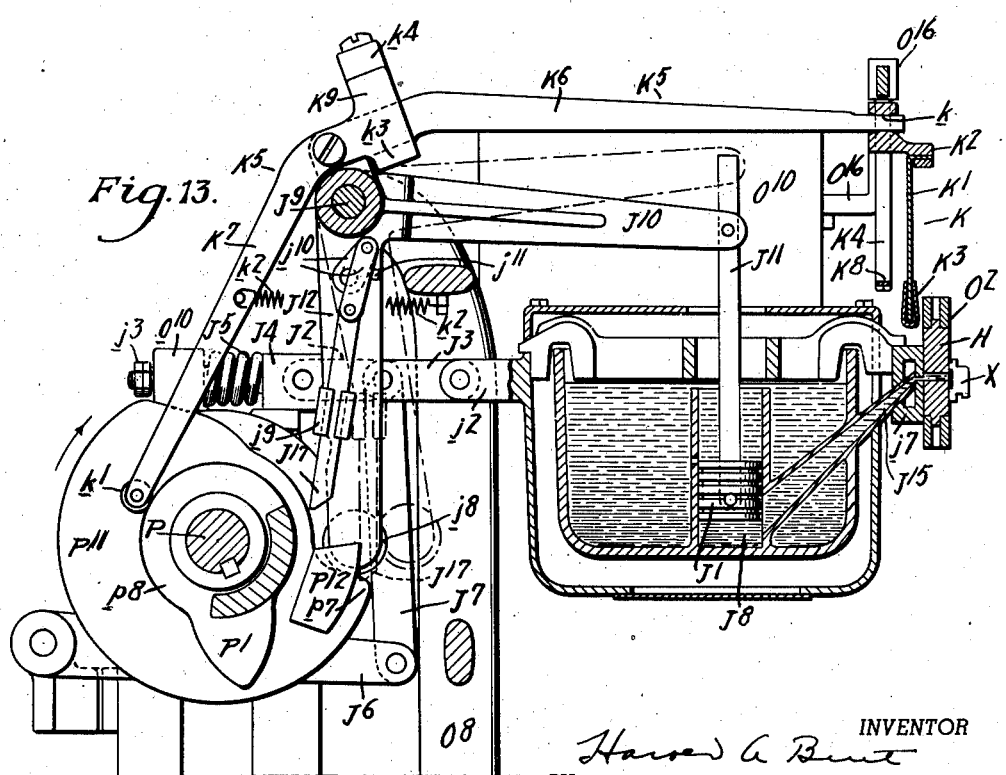
Fig. 13 is a vertical section taken on the line 13—13 of Fig. 3, showing the construction of the metal pot, mouthpiece wiper, and actuating mechanism.

To improve the printing faces of slugs produced from the larger and bolder matrix fonts, the pot plunger control mechanism includes a so-called "quick drop" device comprising, as shown in Fig. 13, a vertically disposed slide rod $J^{17}$ which may be lowered and raised at will into and out of engaging relation with a cam shoe $P^{12}$ fastened to the cam $P^{11}$ in the vicinity of the declination $p^7$. The slide rod $J^{17}$ is mounted on the arm $J^{12}$ of the lever $J^{10}$ in guideways $j^9$ and is connected thereto at its upper end by means of a pair of toggle links $j^{10}$. When the toggle is collapsed past dead center into engagement with a stop pin $j^{11}$, the slide rod will be sustained in a raised position (Fig. 13) with its lower end out of the path of the cam shoe $P^{12}$. However, when the toggle is extended, the slide rod $J^{17}$ will be projected downwardly so as to be engaged by the cam shoe as the cam roller $j^8$ rides off the high portion of the cam $P^{11}$ and will thus hold the lever $J^{10}$ and pot plunger momentarily in the position indicated in broken lines (Fig. 13). Then, as the rod $J^{17}$ rides off the shoe $P^{12}$, the plunger will be allowed to drop suddenly, by action of the spring $J^{14}$, so as to force the metal into the mold under greatly increased pressure and thereby avoid the objectionable whirls and other flaws which frequently appear in the larger type faces.

If for any reason the "lock-up" is not properly effected preparatory to the casting operation, either by failure of the metal pot J to move sufficiently far forwardly to carry the mouthpiece thereof against the back of the mold, or by failure of the hand stick support B to move sufficiently far rearwardly to carry a matrix line in the hand stick against the front of the mold, it is important that the descent of the pot plunger $J^1$ be prevented in order to avert the danger of a metal squirt. Consequently, the machine is equipped with a pump stop attachment which, according to the present improvements, is controlled by the operation of the support B. The mechanism involved (Figs. 1, 3, 4 and 34) includes a bellcrank lever L which is pivotally mounted above the metal pot J upon a fixed bracket $O^{14}$ and normally occupies its active position (Fig. 3) with its longer arm projecting beneath a lateral projection $j^{12}$ of the pot plunger lever $J^{10}$. The shorter arm of the lever L is connected to the rear end of a fore and aft actuating lever $L^1$ hingedly mounted at the front on a bracket $O^{15}$ rising from the front plate $O^2$, and provided with a pull spring $l$ which holds the bellcrank lever L in its active position against a stop pin $l^1$. The operation of the lever $L^1$, to swing the bellcrank lever L from its position beneath the lug $j^{12}$ and to thus permit the descent of the pot plunger $J^1$, is effected by the forward movement of the metal pot through the medium of a rocker element $L^2$ pivoted to the hub portion of the lever $L^1$. At one end, the rocker element $L^2$ is provided with an adjustable banking screw $l^2$ which is arranged to cooperate with an angle piece $j^{13}$ secured to the metal pot, but which in the normal position of the parts (Fig. 3) is located out of the path of the angle piece. The other end of the rocker element overlies an arm $L^3$ projecting rearwardly from a short horizontal rock shaft $L^4$ which is also mounted in the bracket $O^{15}$ (Figs. 1 and 34). The rock shaft $L^4$ is further provided with a depending arm $L^5$ and is operable by a block $b^7$ secured to the rear face of an extended portion $B^5$ of the support B and located directly in front of an adjustable banking screw $l^3$ mounted transversely in the arm $L^5$. To clarify the operation of the parts, it may be stated that, when the support B is moved backwardly to present a matrix line to the mold H, the block $b^7$ is adapted to engage the screw $l^3$ and, through the rock shaft $L^4$, actuate the rocker element $L^2$ so as to carry the banking screw $l^2$ downwardly into the path of the angle piece $j^{13}$. Then, as the metal pot is advanced against the back of the mold, the angle piece is adapted to engage the banking screw $l^2$ and, through the rocker element $L^2$, operate the levers L and $L^1$ to free the pot plunger actuating lever $J^{10}$ in the manner above described. Thereafter, and as soon as the plunger is raised to its uppermost position and the pot starts to retreat, the angle piece $j^{13}$ will break its engagement with the banking screw $l^2$ and permit the lever $L^1$ under the influence of its spring to restore the lever L to its active position beneath the lug $j^{11}$ of the lever $J^{10}$, the block $b^7$ at the same time being carried out of engagement with the banking screw $l^3$ by the forward movement of the support B so as to permit the rocker element $L^2$ to resume its normal or inactive position shown in Fig. 34. Hence, it will be seen that, unless the hand stick Y is properly positioned in the support B against the stop member D and the matrix line properly clamped in the hand stick, the support will be locked in its forward position by the detent G, as previously described, and thus fail to actuate the rocker element $L^2$. In such event, the pot plunger will be locked against operation by the lever L and the machine cycle allowed to proceed in safety.

Occasionally a check up in the operation of certain parts of the machine during a cycle is required and, for this reason, the block $b^7$, as may be observed in Fig. 6, is hingedly mounted on the extension $B^4$ so that at such times it may be swung from its active position, as shown by the full lines, to the vertical position, as shown by the broken lines, out of engaging relation with the banking screw $l^3$.

It is also important that the mouthpiece $j^7$ of the metal pot J be cleared of any surplus metal that might adhere thereto after each casting operation and, to this end, the machine is equipped with a vertically reciprocable mouthpiece wiper K arranged above the mouthpiece $j^7$. As best shown in Figs. 4 and 5, the wiper K comprises an inverted T-shaped plate $K^1$ which depends from an overhead cross member $K^2$ and is provided at its lower end with a horizontally disposed wiper element $K^3$. The cross member $K^2$ is slidably mounted for vertical movement on a pair of fixed guide rods $K^4$ and is operable by a fore and aft lever $K^5$, made in two sections $K^6$, $K^7$, and controlled by the edge cam $P^1$ hereinbefore mentioned. The rods $K^4$, at the top, are secured to a stationary U-shaped bracket $O^{16}$ and, for purposes of rigidity, are provided at the bottom with a connecting tie rod $K^8$. The horizontal section $K^6$ of the lever $K^5$ is pivotally mounted at the rear on the rock shaft $J^9$ (before described) and projects at the front through a rectangularly shaped hole $k$ (Fig. 5) formed transversely in the cross member $K^2$. The other section $K^7$ of said lever is pivotally connected with the section $K^6$ at a point adjacent the rock shaft $J^9$, and at its lower extremity it is equipped with an antifriction roller $k^1$ engaging the edge cam $P^1$. A pull spring $k^2$, connected to the lever section $K^7$ and anchored to the stand bracket $O^8$, holds the roller $k^1$ yieldingly engaged with the concentric low portion $p^8$ of the cam $P^1$ and, through the lower ear $k^3$ of an upper bifurcated portion $K^9$ of the section $K^7$, it sustains the horizontal section $K^6$ of the lever $K^5$ and the wiper K in their inactive position as shown in Fig. 13. To avoid damage to the parts during the operation of the wiper, a compression spring $K^{10}$ (Fig. 1) is arranged between the upper ear $k^4$ of the bifurcation $K^9$ and the lever section $K^6$ so as to permit yielding of the section $K^7$ relatively to the section $K^6$ in case of interference when the high portion $p^9$ of the cam $P^1$ engages the roller $k^1$ to operate the lever $K^5$. The contour of the cam $P^1$ and its angular position on the shaft P is such that, as soon as the metal pot J retreats from contact with the mold H to its normal position (Fig. 4), the wiper element $K^3$, through the connections just described, will be moved in a straight line downwardly and upwardly across the mouthpiece of the pot as required.

Subsequent to the casting operation, the mold H, in the course of its travel across the front plate $O^2$ to the ejecting station, passes a back knife M (see Fig. 31) which is arranged behind the front plate $O^2$ upon a supporting block $M^1$ and is adapted to trim the bottom edge of the contained slug to bring it to the proper height. The knife M is capable of bodily adjustment toward and from the rear face of the mold H by means of a set screw $m$ and is held in its adjusted position by a clamping screw $m^1$ passing transversely through the knife and threaded into the block $M^1$. The set screw $m$ is mounted in an integral projection of the block behind the knife and gives it positive support during the trimming operation.

Adjacent to the knife M, the block $M^1$ is provided with a hinged member $M^3$ which carries a wiper element $M^4$ adapted to clean the rear face of the mold H immediately after the slug has been trimmed. To regulate the wiping action of the element $M^4$, the hinged member is capable of adjustment by a set screw $m^2$ which is mounted in the front plate $O^2$ and engages an arm $m^3$ projecting laterally from the member $M^3$. A pull spring $m^4$, anchored to the front plate and connected with the arm $m^3$, holds the latter yieldingly against the set screw with the element $M^4$ in its proper wiping position relatively to the mold.

Upon the arrival of the mold H at the ejecting station (Figs. 14 to 17), the trimmed slug is pushed forwardly therefrom by a one piece ejector blade N and deposited upon a underlying shelf $O^{18}$ arranged directly in front of the mold and supported upon a stationary bracket $O^{19}$ of the main frame. The ejector blade N is carried at the front end of a fore and after reciprocatory slide $N^1$ and is mounted thereon for quick removal and interchange, being anchored thereto against edgewise displacement by a pair of locating studs $n$ projecting upwardly from the slide into holes $n^1$ formed in the ejector blade, and held in place by a clamping member $N^2$ which is hinged to the slide so that it may be swung upwardly and downwardly into and out of engagement with the blade when desired. The ejector slide $N^1$ is mounted upon front and rear posts $O^{20}$, $O^{21}$ and is guided thereon between gibs $o^{13}$ formed integrally with the posts and engaged with corresponding tongues $n^2$ projecting from opposite sides of the ejector slide. Operation of the ejector slide $N^1$ is controlled from a grooved face cam $P^{12}$ through the medium of a vertical lever $N^3$ connected by a short link $N^4$ to the rear end of the ejector slide. The lever $N^3$ is pivotally mounted at its lower end to one of the bearing brackets $O^{22}$ for the main shaft P, and about midway of its length, it is provided with an anti-friction roller $n^3$ arranged to track in the groove of the cam. At the proper moment during the machine cycle, the lever $N^3$ will be rocked forwardly by the cam to effect the active or slug ejecting stroke of the ejector slide $N^1$ (Fig. 15) and immediately thereafter it is rocked in the other direction to effect the return stroke of the slide (Fig. 14).

In the present embodiment, the ejection of the slug takes place in opposition to a buffer bar or yielding resistant $N^5$ adapted to sustain the slug suspended above the shelf $O^{18}$ when it is pushed from the mold and then, as the ejector blade recedes, permit it to drop to the shelf in the position indicated by the dotted lines (Fig. 17). A reciprocable bail-like transfer element R, which at this time occupies its rearmost position against the mold H, thereupon moves forwardly to deliver the slug into a trough or galley $O^{23}$ arranged directly in front of the shelf $O^{18}$ and supported from the bracket $O^{19}$ by a subsidiary bracket $O^{24}$. The slug resistant $N^5$ (Fig. 16) is T-shaped in form and the shank portion $N^6$ thereof is mounted to slide in a bracket $O^{25}$ which overlies the transfer element R and at its opposite sides is screwed down upon the stationary bracket $O^{19}$. A pull spring $n^4$, attached to the lug $n^5$ at the front end of the shank portion $N^6$ and anchored to the bracket $O^{25}$, tends to move the resistant rearwardly to the position shown in Fig. 14, where it is stopped by the lug $n^5$ in engaging relation with a slug cast in the mold H. In order to prevent the resistant from following the ejector as the latter is withdrawn from the mold, it is locked momentarily in its forward position (Figs. 16 and 17) by a pair of latch pawls $n^6$, so as to thus permit the slub to drop to the shelf $O^{18}$. The latch pawls $n^6$ are pivotally mounted in the bracket $O^{25}$ and are arranged to engage studs $n^7$ projecting from the opposite ends of the cross member $N^7$ of the resistant $N^5$. Each of the latch pawls is supported against gravity in a horizontal position (Fig. 17) by a pin $n^8$, and each is formed with a depending finger $n^9$ disposed in the path of the transfer element R, which latter, as it completes its forward movement (Fig. 14) trips the pawls $n^6$ and thus releases the resistant $N^5$ so that it may be restored to its original position under the influence of its spring $n^4$.

The operation of the slug transfer element R (Figs. 14 and 15) is controlled from the ejector slide $N^1$, the intervening connections including a pair of upright arms $R^1$, $R^2$ rising from a horizontal rock shaft $R^3$ and connected respectively with the side arms of the transfer element R. The rock shaft $R^3$ is rotatably mounted at its opposite ends in the bracket $O^{19}$ and is operable by a vertically disposed lever $R^4$ intermediately pivoted on the rear guide post $O^{21}$ and connected at its lower end by means of a long fore and aft link $R^5$ with the upright arm $R^1$. The upper end of the lever $R^4$ is located in the path of a set screw $n^{10}$ carried in a lug projecting laterally from the ejector slide $N^1$. When the machine is at rest, the parts will be sustained by the ejector slide against the influence of a pull spring $R^6$ in the position shown in Fig. 14 with the slug transfer element R forward and the buffer bar $N^5$ rearward in its slug resisting position. However, during the active stroke of the ejector slide, the set screw will be carried away from the lever $R^4$ and permit the spring $R^6$ to turn the rock shaft $R^3$ in the appropriate direction to move the transfer element rearwardly to its slug receiving position shown in Fig. 15. Thereafter, during the return stroke of the ejector slide, the set screw $n^{10}$ will re-engage and actuate the lever $R^4$ to restore the parts to their original position.

After the slug ejecting operation, the front surface of the mold H is cleared of any particles of metal that might adhere thereto by a wiper element S which is clamped in a holder $S^1$ and adapted to function during the final stage of the machine cycle as the mold is shifted toward the right to its position of rest alongside the ejecting station. As shown in Fig. 33, the holder $S^1$ is pivotally mounted in a sheet metal support $S^2$ on a vertical stud $S^3$ so that it may be swung to and fro to carry the wiper element S into and out of contact with the mold. The support $S^2$ is secured to the bracket $O^{25}$ and presents a stop shoulder $s$ which sustains the holder $S^1$ against the influence of a pull spring $S^4$ in its inactive position, as indicated by the broken lines in Fig. 33. Operation of the holder is effected by a finger $S^5$ which is also pivotally mounted on the vertical stud $S^3$ and projects therefrom into the horizontal path of the mold H. The necessary connection between the holder $S^1$ and the finger $S^5$ is established by means of a vertical pin $s^1$ mounted in the holder and engaged in an open slot $s^2$ formed in the hub portion of the finger. The slot $s^2$ is sufficiently long to permit of a slight movement of the finger $S^5$ relatively to the holder, in opposition to a light torsion spring $s^3$, when the holder is supported in its inactive position against the stop shoulder $s$. The parts are so arranged that, as the mold H in approaching the ejecting station, engages the finger $S^5$ from the right (Fig. 31), the finger yielding, and when the mold passes, the finger will snap back to its former position. On the other hand, as the mold in leaving the ejecting station engages the finger from the opposite direction, the holder $S^1$ will be rocked by the finger, through its engagement with the pin $s^1$, from the position indicated by the broken lines in Fig. 33 to that shown by the full lines therein, with the wiper element S pressed against the face of the mold H. As the mold continues its movement, the wiper is adapted to function in the manner required; and when the mold again passes the finger $S^5$, the pull spring $S^4$ and torsion spring $s^3$ will be allowed to restore the wiper element S and finger $S^5$ to their normal positions.

About this time, the machine cycle of operation is completed and the mold will be stopped in its neutral position of rest between the ejecting station and the back knife M, where a current of air from a blower $S^6$ is directed against the back of the mold to cool it off preparatory to the next casting operation. The blower $S^6$ (Figs. 1 and 3) is supported upon the machine base frame and the connections therefrom to the mold include a conductor head $S^7$ fastened to the face plate $O^2$ and an intermediate conductor pipe $S^8$.

Reference is now directed to Figs. 24 to 29, inclusive, which illustrate the machine driving mechanism and control devices. As shown best in Fig. 24, the main or cam drive shaft P receives its motion from a hollow drive shaft T through the medium of a friction clutch U and a train of reducing gears, including in general: a large gear $T^1$ mounted on a short horizontal shaft $T^2$ and meshing with the driving pinion $T^3$; a smaller gear $T^4$ keyed to the shaft $T^2$ and connected through a pair of idlers $T^5$ with a gear $T^6$ secured to one end of a horizontal lay shaft $T^7$; a gear $T^8$ pinned to the lay shaft and meshing with a gear wheel $T^9$ mounted on a shaft $T^{10}$ coaxially aligned with the shaft $T^2$; and a gear $T^{11}$ secured to the other end of the lay shaft $T^7$ and meshing with the cam shaft driving gear $T^{12}$. The several shafts are mounted in suitable bearing brackets $O^{26}$ and, for reasons about to appear, the arrangement and ratios of the gears are such that the gear wheel $T^9$ and the cam shaft P will be driven in the same direction and at the same speed.

The clutch U (Fig. 24) comprises a motor driven pulley wheel $U^1$, a pair of clutch shoes $U^2$, and a controlling push rod $U^3$ which is mounted for axial movement in the hollow drive shaft T and connected at one end by means of individual toggle links $U^4$ with the clutch shoes. The push rod $U^3$, at its opposite end, abuts against a hinged leaf section $U^5$, and between its ends, it is provided with a compression spring $u$ which seats against a screw plug $t$ in the drive shaft T and tends to effect the engagement of the clutch shoes with the rim of the wheel $U^1$. The leaf section $U^5$ is mounted on a vertical hinge pin $u^1$ in a bracket $O^{27}$ fastened to the upright column $O^{10}$, and it is equipped with a stop plate $U^6$ which projects beyond the same into the path of a finger $T^{13}$ carried by the gear wheel $T^9$. The finger $T^{13}$ is pivotally mounted on the shaft $T^{10}$ and, as shown in Fig. 25, it is formed with a squared off banking surface $t^1$ arranged to engage a stop pin $u^2$ mounted transversely in the projecting portion of the stop plate $U^6$.

As will be observed (Fig. 29), the pivotal movement of the finger $T^{13}$ is limited, in one direction, by a stud $t^2$ projecting from the contiguous side of the gear wheel $T^9$ and, in the other direction, by a spring plunger $T^{14}$ tending to hold the finger against the stud. The plunger $T^{14}$ is mounted in a bracket $T^{15}$ fastened to the gear $T^9$ and engages the finger at a point adjacent the shaft $T^{10}$. When a cycle of operation is about completed, with the gear wheel $T^9$ turning in the direction indicated, a bevel surface $t^3$ formed on the finger $T^{13}$ is adapted to engage a corresponding bevel surface $u^3$ formed on the stop member $U^6$ and, through such engagement, swing the finger away from the stud $t^2$ against the influence of the plunger $T^{14}$ until the head portion of the latter banks against the lower end of the bracket $T^{15}$. The bevel surfaces $t^3$ and $u^3$ will then be cammed apart so as to force the hinged plate $U^5$ in the appropriate direction to disengage the clutch U. The stop pin $u^2$ is thus brought beneath the banking surface $t^1$ on the finger $T^{13}$ to stop the rotation of the cam shaft P as the cycle is completed.

A cycle of operation is inaugurated by the operation of a hand lever V located conveniently at the front of the machine and operatively connected through the medium of a fore and aft slide rod $V^1$ with a bifurcated rocker element $V^2$ arranged adjacent the hinged plate $U^5$ and pivotally mounted upon a rearward extension $o^{14}$ of the bracket $O^{27}$. The slide rod (Fig. 24) is mounted in stationary guideways $o^{15}$ and, at its front end, it is connected with a crank arm $V^3$ of a vertical rock shaft $V^4$ operable by the hand lever V and mounted in upper and lower bearing brackets $o^{16}$ (Fig. 1) projecting forwardly from the upright column $O^{10}$. On one side of its pivotal axis, the rocker element $V^2$ is attached by means of a pin and slot connection $v$ to the rear end of the slide rod $V^1$ and, on the other side thereof, it is formed with two prongs $v^1$ and $v^2$ which, in the normal position of the rocker element (Fig. 24), terminate in close spaced relation with the stop plate $U^6$ of the leaf section $U^5$. However, when the hand lever is pulled forwardly, said rocker element, through the connections just described, will be turned clockwise to the position shown in Fig. 26 and, as a result, the leaf section $U^5$ will be moved by the prong $v^1$ slightly further toward the right in order to disengage the stop pin $u^2$ from the banking surface $t^1$ and thus permit the spring plunger $T^{14}$ to swing the finger $T^{13}$ from its position behind the leaf section $T^{13}$ downwardly against the stud $t^2$. As the hand lever is released, the clutch spring $u$ will act to restore the rocker element to its original position and effect the engagement of the clutch U to start the rotation of the cam shaft, the leaf section $U^5$ at the same time being moved into the path of the finger $T^{13}$ to automatically stop the operation of the machine when the cycle is completed.

If, for any of the well known reasons, it is desired to stop the machine during a cycle of operation, the hand lever V is pushed rearwardly in order to pull the slide rod $V^1$ forwardly and turn the rocker element counterclockwise to the position indicated by the dotted lines in Fig. 26. This operation causes the second prong $v^2$ of said element to actuate the leaf section as before to disengage the clutch U. However, and due to the squared or flat extremity of the prong $v^2$, the clutch will be held disengaged until the hand lever is pulled forwardly again to its neutral or intermediate position indicated by the broken lines in Fig. 24.

In the production of the low blank slugs used as furniture support for the overhang portions of the slugs, the machine may be set or adjusted for continuous operation by means operable independently of the clutch control mechanism above described. Thus, the stop plate $U^6$, as will be noted in Fig. 24, is slidably mounted in the hinged leaf section $U^5$ so that it may be moved endwise a limited distance in opposite directions to carry the stop pin $u^2$ into and out of engaging relation with the finger $T^{13}$. Such endwise movements of the stop plate $U^6$ are controlled from the front of the machine by a push and pull button W which is arranged conveniently below the hand lever V and operatively connected with one arm of a bellcrank lever $W^1$ pivotally mounted in the front bracket $O^1$. The other arm of the lever is attached to the front end of a fore and aft slide rod $W^2$ which, as shown best in Fig. 27, is mounted in the column $O^{10}$ and, at its rear end, fits loosely over a stud $u^4$ on the stop plate so as not to interfere with the pivotal movements of the hinged section $U^5$. The button W is also mounted in the bracket $O^1$ for a limited axial movement and, when pushed inwardly, the bellcrank lever $W^1$ will be rocked in the appropriate direction to pull the stop plate $U^6$ forwardly through the connecting rod $W^2$ and thus release the finger $T^{13}$ of the gear wheel $T^9$. As a result, the engagement of the clutch will be effected in the manner already described and the machine will operate until the button W is pulled outwardly to project the stop plate again into the path of the finger $T^{12}$. It will be understood that, according to the unit system proposed, a 6 pt. or a 12 pt. mold may be used exclusively in casting the blank slugs and, also, that a quad block or solid blank matrix, formed without the routing notch $x$, will be employed, said matrix to be clamped in the hand stick Y and properly positioned in the support B before the button is operated and the first machine cycle inaugurated.

From the foregoing description, the construction of the parts and their mode of operation should be clear without further recapitulation. However, it may be added that the general arrangement of the major elements of the machine and their disposition in relation to one another are such as to promote the maximum speed and facility in slug production. Moreover, the timing of the parts is a factor in this direction. For example, the shifting of the mold to the casting position, the presentation of the matrix line thereto, and the forward movement of the pot against the back of the mold, all take place in a pre-arranged order or sequence, but the timing of each operation overlaps the other so that all three will be effected almost simultaneously upon the inauguration of the machine cycle. After the casting operation, and the shifting of the mold to the ejecting station, the support B will have returned to its forward position, where the hand stick may be removed and another substituted therefor, while the slug is being ejected from the mold and the latter restored to its neutral position of rest. The slug trimming and the mold and mouthpiece wiping operations require no extra time since they are all subordinate to the operations just mentioned. Furthermore, since the adjustments of the receptacle for the hand stick transversely of the mold slot are effected according to a 6 pt. unit system, in order that 6 pt. or 12 pt. furniture may be used exclusively for supporting the overhang portions of the slugs, there will be no waste of time in selecting furniture of miscellaneous point sizes.

Figure 35:
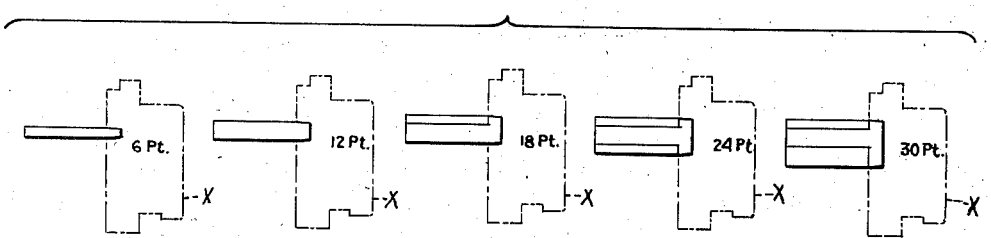
Figs. 35 and 36 are diagrammatic views illustrating the manner of supporting the overhang portions of slugs ranging from 18 pt. to 72 pt. and produced according to a 6 pt. unit system.
Figure 36:
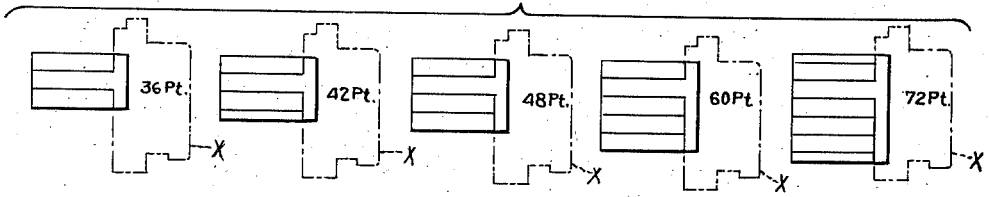
Figure 39:
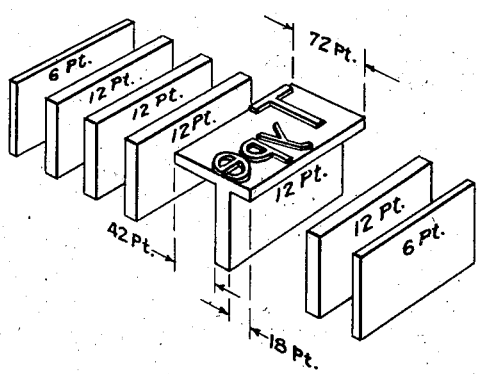
Fig. 39 is a perspective view of a 72 pt. T-shaped slug and showing the blank slugs selected for supporting the overhang portions thereof.

The manner in which these low blank slugs may be used in conjunction with slugs of the overhang variety within the 72 pt. range is clearly illustrated by the series of diagrams in Figs. 35 and 36 and also by the perspective view shown in Fig. 39. These diagrams speak for themselves and require no detailed description.

Having thus described my invention, what I claim is:

1. In a slug casting machine having a casting station, an ejecting station and an intermediate mold rest station, the combination of a horizontally reciprocable mold adapted during each machine cycle of operation to be moved, first in one direction to the casting station, then in the opposite direction to the ejecting station, and finally to the intermediate rest station and time-controlled means for effecting such movements of the mold.

2. A combination according to claim 1, wherein the mold operating means includes a reciprocating rack bar connected to the mold, and periodically operated gear mechanism for actuating the rack bar.

3. A combination according to claim 1, including a hand stick for holding a composed line of matrices, and support therefor located at the casting station and movable automatically during each machine cycle of operation to carry the hand stick into and out of casting relation with the mold.

4. A combination according to claim 1, including a stationary back knife for trimming the base of slugs cast in the mold as the latter is moved from the casting to the ejecting station.

5. A combination according to claim 1, including means for wiping the front face of the mold as it is moved from the ejecting station to the rest station.

6. A combination according to claim 1, including wiping means for the front face of the mold movable from inactive to active position and controlled directly by the mold during its reciprocating movements.

7. A combination according to claim 1, including a back knife for trimming the base of slugs cast in the mold as the latter is moved from the casting to the ejecting station, and means associated with the knife for wiping the rear face of the mold after the slug has been trimmed.

8. A combination according to claim 1, including an air blower located at the mold rest station to cool the mold between casting operations.

9. In a slug casting machine, the combination of a hand stick for holding a composed line of matrices and equipped with line clamping means, a movable support adapted during a machine cycle of operation to carry the hand stick into and out of casting position, and automatic safety means controlled by the clamping means to prevent the operation of the support unless the matrix line is properly clamped in the hand stick.

10. In a slug casting machine, the combination of a hand stick for holding a composed line of matrices, a support therefor movable backwardly and forwardly during each machine cycle of operation to carry the hand stick into and out of casting position, and automatic means including a slide mounted in the support to effect vertical alignment of the matrices in the hand stick as the latter is carried to the casting position and also to insure the face alignment of the matrices as the hand stick is inserted in the support.

11. In a slug casting machine, the combination of a hand stick for holding a composed line of matrices, a support therefor movable backwardly and forwardly during each machine cycle of operation to carry the hand stick into and out of casting position, and unitary means for effecting face alignment of the matrices as the hand stick is inserted in the support, and operable as the support is moved backwardly to casting position to effect vertical alignment of the matrices in the hand stick.

12. A combination according to claim 11, including a device controlled from the main drive shaft of the machine for operating the hand stick support, and wherein the aligning means is operatively connected with said device.

13. In a slug casting machine, the combination of a hand stick for holding a composed line of matrices, a support therefor movable during each machine cycle of operation to carry the hand stick into and out of casting position, and automatic safety means to positively prevent removal of the hand stick from the support while it is in the casting position.

14. A combination according to claim 13, including a slide for effecting vertical alignment of the matrices in the hand stick and wherein the automatic safety means includes a stud depending from the slide and arranged to engage a corresponding aperture formed in the hand stick.

15. In a slug casting machine, the combination of a hand stick for holding a composed line of matrices, a support therefor, a receptacle for the hand stick mounted for vertical adjustment in the support to locate the matrix characters in different selected positions, and manual means for effecting the adjustments of the receptacle as desired.

16. A combination according to claim 15, wherein the receptacle adjusting means includes a micrometer screw device mounted in the support and operatively connected with the receptacle.

17. A combination according to claim 15, wherein the adjustments of the receptacle are effected according to a given unit system of measure in order that the width of the overhang portions of the slugs may be determined in multiples of said unit.

18. A combination according to claim 15, wherein the adjustments of the receptacle are effected according to a 6 pt. unit system of measure and the width of the mold slot is selected according to the same unit system.

19. In a slug casting machine, the combination of a slotted mold movable endwise horizontally in a straight path to and from casting position, a metal pot arranged at the rear side of the mold and movable bodily fore and aft in a straight horizontal path into and out of engagement with the mold when the latter is in casting position, a line support arranged at the front side of the mold and movable bodily fore and aft in a straight horizontal path into and out of engagement with the mold when the latter is in casting position, and power mechanism for effecting such movements of the parts in timed relation.

20. A combination according to claim 19, wherein the power mechanism includes means for holding the line support rigidly in casting position to take the thrust of the metal pot as the latter is advanced into contact with the mold for the proper lockup prior to casting.

21. A combination according to claim 19, including as an additional element automatic safety means to prevent operation of the pot plunger in the event that the pot fails to make proper contact with the mold prior to casting.

22. A combination according to claim 19, including as an additional element automatic safety means to prevent operation of the pot plunger in the event that the line holder fails to make proper contact with the mold prior to casting.

23. A combination according to claim 19, wherein the power mechanism includes means for exerting a lock-up pressure between the parts as the pot is advanced into contact with the mold.

24. In a slug casting machine, the combination of a hand stick for holding a composed line of matrices and equipped with line clamping means including an abutment capable of yielding a limited distance when the matrix line is properly clamped in the hand stick, a support therefor movable backwardly and forwardly during each machine cycle of operation to carry the hand stick into and out of casting position, and automatic locking means controlled by the position of said abutment to lock the support against operation unless the hand stick is properly positioned therein and unless the matrix line is properly clamped in the hand stick.

25. In a slug casting machine, the combination of a hand stick for holding a composed line of matrices, a support therefor movable backwardly and forwardly during each machine cycle of operation to carry the hand stick into and out of casting position, a stop for locating the hand stick endwise in the support, and automatic safety means controlled by the hand stick to lock the support against operation unless the hand stick is properly positioned therein, said automatic means including a latch movable to inactive position to release the support as the hand stick engages said stop.

26. In a slug casting machine, the combination of a hand stick for holding a composed line of matrices, a support wherein the hand stick is removably mounted and movable backwardly and forwardly during each machine cycle of operation to carry the hand stick into and out of casting position, time-controlled means for effecting such movements of the support, and an automatically operated aligning bar movable vertically into and out of engagement with the matrices as the hand stick is carried to and from casting position.

27. In a slug casting machine, the combination of a hand stick for holding a composed line of matrices, a support wherein the hand stick is removably mounted and movable backwardly and forwardly during each machine cycle of operation to carry the hand stick into and out of casting position, time-controlled means for effecting such movements of the support, a vertically movable aligning bar mounted in the hand stick, and an automatically operated slide mounted in the support for actuating the aligning bar.

HAROLD A. BURT.

REFERENCES CITED

The following references are of record in the file of this patent:

UNITED STATES PATENTS

| Number | Name | Date |
|---|---|---|
| 952,569 | Kennedy | Mar. 22, 1910 |
| 2,035,444 | Albrecht | Mar. 31, 1936 |
| 1,232,718 | Reade | July 10, 1917 |
| 1,720,331 | Indahl | July 9, 1929 |
| 1,850,260 | Daly | Mar. 22, 1932 |
| 1,630,882 | Zeh | May 31, 1927 |
| 1,927,764 | Willis | Sept. 19, 1933 |
| 1,971,399 | Frohlander | Aug. 28, 1934 |
| 2,135,683 | Sundstrom | Nov. 8, 1938 |
| 1,378,045 | Low | May 17, 1921 |
| 1,980,110 | Stouges | Nov. 6, 1934 |
| 1,910,566 | Rogers | May 23, 1933 |
| 1,108,328 | Goddard | Aug. 25, 1914 |
| 2,315,234 | Turenne | Mar. 30, 1943 |
| 2,082,531 | Albrecht | June 1, 1937 |
| 1,144,340 | Campbell | June 22, 1915 |
| 2,266,072 | Plastaras | Dec. 16, 1941 |